United States Patent
Okabe et al.

(10) Patent No.: US 12,007,475 B2
(45) Date of Patent: Jun. 11, 2024

(54) OBJECT DETECTION APPARATUS

(71) Applicant: Panasonic Intellectual Property Management Co., Ltd., Osaka (JP)

(72) Inventors: Yoshimasa Okabe, Kanagawa Ken (JP); Toshimasa Takagi, Kanagawa Ken (JP); Hiroki Yamashita, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 235 days.

(21) Appl. No.: 17/688,354

(22) Filed: Mar. 7, 2022

(65) Prior Publication Data

US 2022/0308210 A1  Sep. 29, 2022

(30) Foreign Application Priority Data

Mar. 24, 2021 (JP) .................................. 2021-050223

(51) Int. Cl.
*G01S 15/931* (2020.01)
*G01S 15/10* (2006.01)
(Continued)

(52) U.S. Cl.
CPC .......... *G01S 15/931* (2013.01); *G01S 15/101* (2013.01); *G01S 15/12* (2013.01); *G01S 15/14* (2013.01)

(58) Field of Classification Search
CPC ...... G01S 15/931; G01S 15/101; G01S 15/12; G01S 15/14
(Continued)

(56) References Cited

U.S. PATENT DOCUMENTS

2016/0114798 A1* 4/2016 Kim .................... G08G 1/166
701/41
2018/0218600 A1* 8/2018 Fujita .................. G08G 1/16
(Continued)

FOREIGN PATENT DOCUMENTS

JP  2004-045320  2/2004
JP  2015-121959  7/2015
(Continued)

OTHER PUBLICATIONS

Notice of Allowance from Japan Patent Office (JPO) in Japanese Patent Appl. No. 2021-050223, dated May 23, 2023, together with an English language translation.
(Continued)

*Primary Examiner* — Kerri L McNally
(74) *Attorney, Agent, or Firm* — Greenblum & Bernstein, P.L.C.

(57) ABSTRACT

An object detection apparatus includes distance measuring devices and a hardware processor. The distance measuring devices are provided in a vehicle and emit ultrasonic waves. The distance measuring devices detect an object around the vehicle and obtain distance information indicating a distance to the detected object. The hardware processor determines a scene in which the vehicle is placed. The determination is performed on the basis of the distance information, vehicle speed information, an image of surroundings of the vehicle, and/or a location of the vehicle on a map. The hardware processor performs, on the basis of a scene determination result, setting of a high-sensitivity area where sensitivity for detecting the reflected waves is temporarily increased, a change of an emission interval of the ultrasonic waves, and/or a change of an emission sequence of the ultrasonic waves.

17 Claims, 23 Drawing Sheets

(51) Int. Cl.
*G01S 15/12* (2006.01)
*G01S 15/14* (2006.01)

(58) Field of Classification Search
USPC .......................................................... 367/93
See application file for complete search history.

(56) References Cited

U.S. PATENT DOCUMENTS

2020/0023797 A1\* 1/2020 Volos ................... B60R 21/013
2020/0209869 A1\* 7/2020 Toyoura ............... G01S 17/931

FOREIGN PATENT DOCUMENTS

JP  2018-081050  5/2018
WO  2019/058720  3/2019

OTHER PUBLICATIONS

Office Action from Japan Patent Office (JPO) in Japanese Patent Appl. No. 2021-050223, dated Dec. 20, 2022, together with an English language translation.

\* cited by examiner

TIME

OBJECT DETECTION APPARATUS

CROSS-REFERENCE TO RELATED APPLICATIONS

This application is based upon and claims the benefit of priority from Japanese Patent Application No. 2021-050223, filed on Mar. 24, 2021, the entire contents of which are incorporated herein by reference.

FIELD

The present disclosure relates generally to an object detection apparatus.

BACKGROUND

In the related art, there are known techniques of detecting objects such as preceding vehicles, obstacles, or pedestrians by using a distance measuring sensor such as ultrasonic sensors provided in a vehicle. In addition, there are also known techniques of performing various control for improving the driving safety of a vehicle on the basis of an object detection result obtained by a distance measuring sensor, such as control on activation of automatic braking and notification to a driver (for example, Japanese Patent Application Laid-open No. 2018-081050 A).

However, pedestrians or the like has low reflectance to ultrasonic waves, so necessitating the improvement of the precision of detecting such pedestrians. In particular, simply increasing the sensitivity of detection using ultrasonic waves in all cases will lead to the detection of even an unnecessary object sometimes. Thus, it is desirable to detect pedestrians or the like with high precision in accordance with the situation around the vehicle.

SUMMARY

An object detection apparatus includes distance measuring devices, each being provided in a vehicle, and a hardware processor connected to a memory. The distance measuring devices are each configured to emit ultrasonic waves, measure a time from the emission until receiving reflected waves reflected by an object around the vehicle, and detect an object around the vehicle and obtain distance information indicating a distance to the detected object. The hardware processor is configured to function as a scene determination unit and a control unit. The scene determination unit serves to determine a scene in which the vehicle is placed. The determination is performed on the basis of at least one of the distance information, vehicle speed information indicating a speed of the vehicle, image information obtained by capturing an image of surroundings of the vehicle by an image pickup device, and location information identifying a location of the vehicle on a map. The control unit serves to perform, on the basis of a scene determination result obtained by the scene determination unit, at least one of setting of a high-sensitivity area where sensitivity for detecting the reflected waves is temporarily increased, a change of an emission interval of the ultrasonic waves, and a change of an emission sequence of the ultrasonic waves.

DETAILED DESCRIPTION

Embodiments of an object detection apparatus according to the present disclosure will be described with reference to the drawings.

Figure 1:
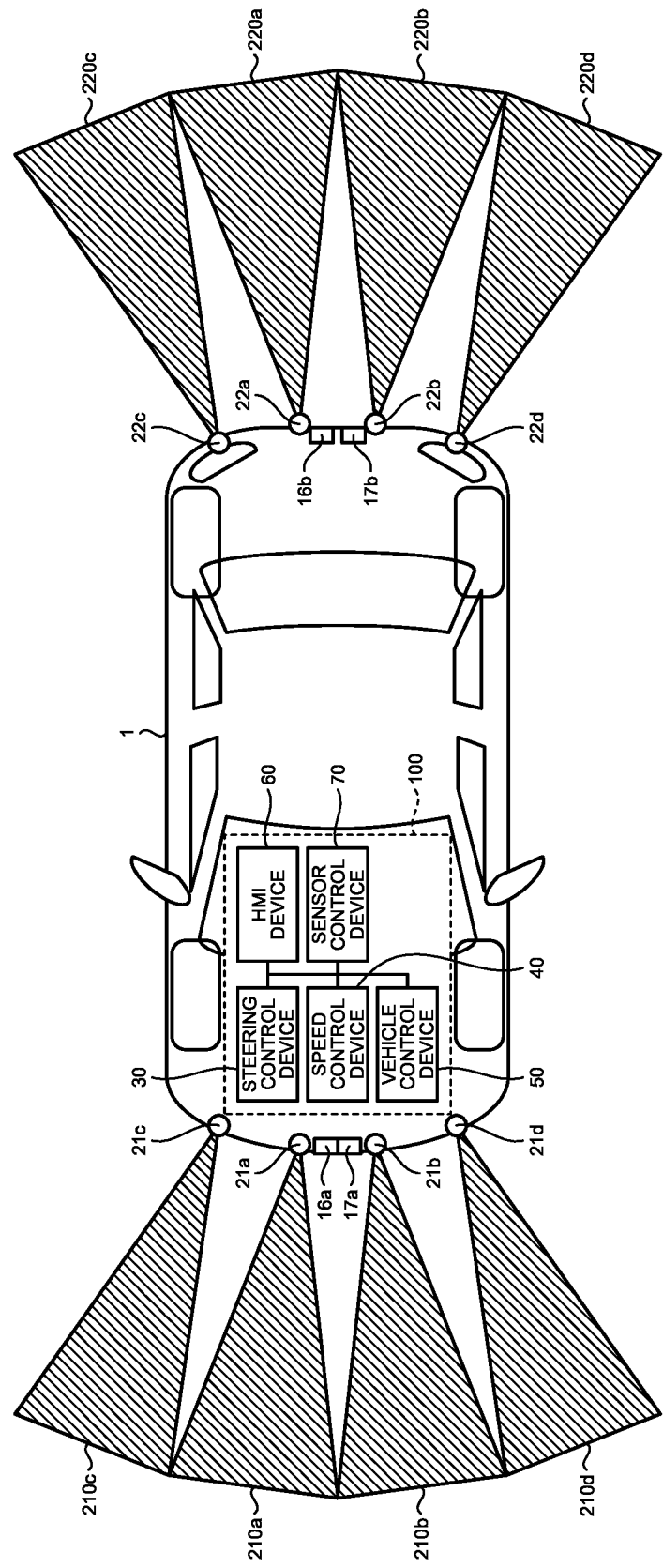
FIG. 1 is a diagram illustrating an exemplary configuration of a vehicle equipped with an in-vehicle system according to an embodiment.

FIG. 1 is a diagram illustrating an exemplary configuration of a vehicle 1 equipped with an in-vehicle system 100 according to a first embodiment. As illustrated in FIG. 1, the vehicle 1 includes a steering control device 30, a speed control device 40, a vehicle control device 50, a human-machine interface (HMI) device 60, and a sensor control device 70. In the present embodiment, the in-vehicle system 100 includes the steering control device 30, the speed control device 40, the vehicle control device 50, the HMI device 60, and the sensor control device 70. Moreover, the vehicle 1 can be further provided with other devices. In addition, while FIG. 1 illustrates the steering control device 30, the speed control device 40, the vehicle control device 50, the HMI device 60, and the sensor control device 70 as individual devices, the entirety or part of these devices can be integrated.

The vehicle 1 includes sonars 21a to 21d and 22a to 22d, image pickup devices 16a and 16b, and radars 17a and 17b.

The sonars 21a to 21d and 22a to 22d is an example of the distance measuring devices in the present embodiment. The sonars 21a to 21d out of the sonars 21a to 21d and 22a to 22d are provided at the front-end portion of the vehicle 1. The sonars 22a to 22d are provided at the rear-end portion of the vehicle 1. The individual sonars 21a to 21d or 22a to 22d are referred to as sonar 21 or 22 or sonars 21 and 22 unless they are particularly distinguished individually. In addition, the sonars 21a to 21d are collectively referred to as a front sonar 21. In addition, the sonars 22a to 22d are collectively referred to as a rear sonar 22. The sonars 21 and 22 may each be referred to as a distance measuring device.

The sonars 21 and 22 are arranged on the vehicle 1 at a position advantageous for detecting a surrounding object or performing distance measurement (ranging). In one example, the sonars 21 and 22 is arranged at a distance from each other on the bumpers at the front-end and rear-end portions of the vehicle 1 to detect an object in front of and behind the vehicle 1.

The sonars 21 and 22 are provided in the vehicle 1 to emit ultrasonic waves. The sonars 21 and 22 measure a time from the emission of the ultrasonic waves until receiving reflected waves reflected by an object around the vehicle 1, thereby detecting the object around the vehicle 1 and obtaining distance information indicating a distance to the detected object. Note that, in the present embodiment, the term "object" or "obstacle" is construed to include pedestrians and other vehicles. In addition, things that do not hinder the vehicle 1 from traveling, such as irregularities on the road surface, are not included in the obstacles.

More specifically, the sonar provided on the side close to the right in the middle of the front-end portion of the vehicle 1 is a first front central sonar 21a, and the sonar provided on the side close to the left in the middle of the front-end portion of the vehicle 1 is a second front central sonar 21b. In addition, the sonar provided near the corner on the right of the first front central sonar 21a at the front-end portion of the vehicle 1 is a first front corner sonar 21c. Further, the sonar provided near the corner on the left of the second front central sonar 21b at the front-end portion of the vehicle 1 is a second front corner sonar 21d.

The sonar provided on the side close to the right in the middle of the rear-end portion of the vehicle 1 is a first rear central sonar 22a, and the sonar provided on the side close to the left in the middle of the rear-end portion of the vehicle 1 is a second rear central sonar 22b. In addition, the sonar provided near the corner on the right of the first rear central sonar 22a at the rear-end portion of the vehicle 1 is a first rear corner sonar 22c. Further, the sonar provided near the corner on the left of the second rear central sonar 22b at the rear-end portion of the vehicle 1 is a second rear corner sonar 22d.

In FIG. 1, the range in which an object can be detected by the first front central sonar 21a is set as a detection range 210a, and the range in which an object can be detected by the second front central sonar 21b is set as a detection range 210b. In addition, the range in which an object can be detected by the first front corner sonar 21c is set as a detection range 210c, and the range in which an object can be detected by the second front corner sonar 21d is set as a detection range 210d. The detection ranges 210a to 210d are simply referred to as a detection range 210 unless they are particularly distinguished individually.

In addition, the range in which an object can be detected by the first rear central sonar 22a is set as a detection range 220a, and the range in which an object can be detected by the second rear central sonar 22b is set as a detection range 220b. In addition, the range in which an object can be detected by the first rear corner sonar 22c is set as a detection range 220c, and the range in which an object can be detected by the second rear corner sonar 22d is set as a detection range 220d. The detection ranges 220a to 220d are simply referred to as a detection range 220 unless they are particularly distinguished individually.

In FIG. 1, while adjacent range zones of the detection range 210 or 220 are illustrated separately from each other, the detection ranges 210 of the adjacent sonars 21 overlap with each other and the detection ranges 220 of the adjacent sonars 22 overlap with each other in practice.

In one example, in the case where the vehicle 1 travels forward, the front-end portion of the vehicle 1 is on the side of the traveling direction of the vehicle 1. Thus, the first front central sonar 21a is an example of a first central distance measuring device, and the second front central sonar 21b is an example of a second central distance measuring device. The first front central sonar 21a and the second front central sonar 21b are provided to be directed in the traveling direction of the vehicle 1. In addition, in this case, the first front corner sonar 21c is an example of a first corner distance measuring device, and the second front corner sonar 21d is an example of a second corner distance measuring device. In addition, in the case where the front-end portion of the vehicle 1 is on the side of the traveling direction of the vehicle 1, the first front central sonar 21a and the first front corner sonar 21c are an example of a right-hand distance measuring device provided to direct the side close to the right direction from the traveling direction of the vehicle 1. In this case, the second front central sonar 21b and the second front corner sonar 21d are an example of a left-hand distance measuring device provided to direct the side close to the left direction from the traveling direction of the vehicle 1.

Moreover, the first front central sonar 21a, the second front central sonar 21b, the first rear central sonar 22a, and the second rear central sonar 22b are simply referred to as a central sonar 21a, 21b, 22a, or 22b, respectively, unless they are particularly distinguished individually. In addition, the first front corner sonar 21c, the second front corner sonar 21d, the first rear corner sonar 22c, and the second rear corner sonar 22d are simply referred to as a corner sonar 21c, 21d, 22c, or 22d, respectively, unless they are particularly distinguished individually. Moreover, the specific description is now given in the present embodiment mainly by taking an exemplary case where the vehicle 1 travels forward. However, for example, if the vehicle 1 travels backward, the function exemplified by using the front sonar 21 can be applied to the rear sonar 22.

In the case where the vehicle 1 travels straight forward, an obstacle located in the traveling direction of the vehicle 1 is detected by the first front central sonar 21a and the second front central sonar 21b, which are provided on the inward side. In addition, in a case where the vehicle 1 turns left or right toward the front, an object located at the left turn or the right turn destination is detected by the first front corner sonar 21c or the second front corner sonar 21d, respectively. In addition, if an obstacle appears from the right side of the vehicle 1 to the right front of the vehicle 1, the obstacle is first detected by the first front corner sonar 21c or the first front central sonar 21a. In addition, if an obstacle appears from the left side of the vehicle 1 to the left front of the vehicle 1, the obstacle is first detected by the second front corner sonar 21d or the second front central sonar 21b.

The installation location and number of the sonars 21 and 22 are not limited to the example illustrated in FIG. 1. Moreover, the details of the functions of the sonars 21 and 22 are described later.

The image pickup devices 16a and 16b are cameras that capture an image of the surroundings of the vehicle 1. In FIG. 1, the image pickup device 16a is provided at the front-end portion of the vehicle 1 and is capable of capturing an image of the surroundings including ahead of the vehicle 1. In addition, the image pickup device 16b is provided at the rear-end portion of the vehicle 1 and is capable of capturing an image of the surroundings including behind the vehicle 1. The installation location and number of the image pickup devices 16a and 16b are not limited to the example illustrated in FIG. 1.

Moreover, the image pickup device 16b at the rear does not necessarily need to be provided, and it is also possible to attach only the image pickup device 16a to the vehicle 1. The image pickup devices 16a and 16b are now simply referred to as an image pickup device 16 unless they are particularly distinguished individually. The image pickup device 16 is an example of an image pickup unit in the present embodiment.

The radars 17a and 17b detect an object around the vehicle 1 and measure the distance between the object and the vehicle 1. In one example, the radar 17a measures the distance between the vehicle 1 and the preceding vehicle located in front of the vehicle 1. In addition, the radar 17b measures the distance between the vehicle 1 and the following vehicle located behind the vehicle 1. The radars 17a and 17b are simply referred to as a radar 17 unless they are distinguished individually. The radar 17 emits radio waves such as millimeter waves and receives radio waves reflected by an object. Moreover, the installation location and number of the radars 17 are not limited to the example illustrated in FIG. 1.

Moreover, the sonars 21 and 22, the image pickup device 16, and the radar 17 can be collectively referred to as a detection device. In addition, the vehicle 1 can be further provided with other detection devices such as light detection and ranging or laser imaging detection and ranging (LiDAR). In addition, the vehicle 1 does not necessarily need to be provided with either or both of the image pickup device 16 and the radar 17. In addition, the vehicle 1 can be provided with an antenna capable of receiving a global positioning system (GPS) signal and a GPS device (not illustrated) that specifies GPS coordinates representing the location of the vehicle 1 on the basis of the received GPS signal.

The steering control device 30 controls the steering angle of the vehicle 1. The steering control device 30 is also referred to as a steering angle control device. The steering control device 30 is arranged at, for example, a position facilitating the steering assistance of a power steering of the vehicle 1.

The speed control device 40 controls the acceleration and braking of the vehicle 1. The speed control device 40 is arranged at, for example, a position facilitating the controlling of an engine or motor and a brake.

The vehicle control device 50 is a device that controls various behaviors of the vehicle 1 and is arranged, for example, near the steering control device 30 and the speed control device 40.

The HMI device 60 includes a display, a touch panel, a switch, and the like. The display is capable of displaying information, and the touch panel or the switch is capable of receiving operations performed by the user. Moreover, the display and the touch panel can be configured as an integrated device. The display is also referred to as a display unit. The touch panel and the switch are also referred to as an operation unit. In addition, the display unit and the operation unit included in the HMI device 60 are arranged around the driver's seat.

The sensor control device 70 controls the sonars 21 and 22. Moreover, the sensor control device 70 can further control the image pickup device 16 and the radar 17. Alternatively, the vehicle control device 50 described above can control the image pickup device 16 and the radar 17.

The sensor control device 70 and the sonars 21 and 22 are an example of an object detection apparatus in the present embodiment. Moreover, the sensor control device 70 alone can be used as an example of the object detection apparatus. In addition, the object detection apparatus can include the entire in-vehicle system 100, or any of the steering control device 30, the speed control device 40, the vehicle control device 50, and the HMI device 60 included in the in-vehicle system 100.

The steering control device 30, the speed control device 40, the vehicle control device 50, the HMI device 60, and the sensor control device 70 are connected to each other by wire via a local area network such as a controller area network (CAN). In addition, the sonars 21 and 22, the image pickup device 16, and the radar 17 can be connected to the local area network or can be connected to the sensor control device 70 or the vehicle control device 50 over dedicated wiring.

Figure 2:
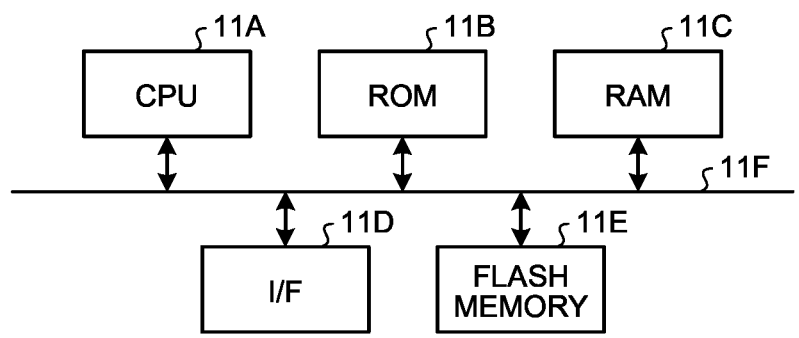
FIG. 2 is a diagram illustrating an exemplary hardware configuration of a sensor control device according to an embodiment.

The hardware configuration of the sensor control device 70 will be described. FIG. 2 is a diagram illustrating an exemplary hardware configuration of the sensor control device 70 according to the first embodiment. As illustrated in FIG. 2, in the sensor control device 70, a central processing unit (CPU) 11A, a read-only memory (ROM) 11B, a random-access memory (RAM) 11C, an interface (I/F) 11D, a flash memory 11E, and the like are connected to each other via a bus 11F, which can be hardware configuration achievable using a typical computer.

The CPU 11A (an example of the hardware processor) is an arithmetic logic unit that controls the entire sensor control device 70. Moreover, the CPU 11A is an example of a processor, and other processors or processing circuits can be provided in place of the CPU 11A. The ROM 11B stores a program or the like that allows the CPU 11A to execute various types of processing. The RAM 11C is, for example, the main storage unit of the sensor control device 70 and stores data necessary for the CPU 11A to execute various types of processing. The I/F 11D is an interface for transmitting and receiving data. In addition, the I/F 11D can transmit or receive information to or from other devices provided in the vehicle 1 via a CAN or the like in the vehicle 1. In addition, the flash memory 11E is an example of a non-volatile and writable storage medium. The ROM 11B, the RAM 11C, and the flash memory 11E are also referred to as a storage unit. Moreover, the sensor control device 70 can be provided with other storage devices such as a hard disk drive (HDD) in place of or in addition to the flash memory 11E.

The hardware configuration of the steering control device 30, the speed control device 40, the vehicle control device 50, and the HMI device 60 also can include, for example, a processing circuit, ROM, RAM, I/F, and flash memory. An example of the processing circuit includes a CPU.

Figure 3:
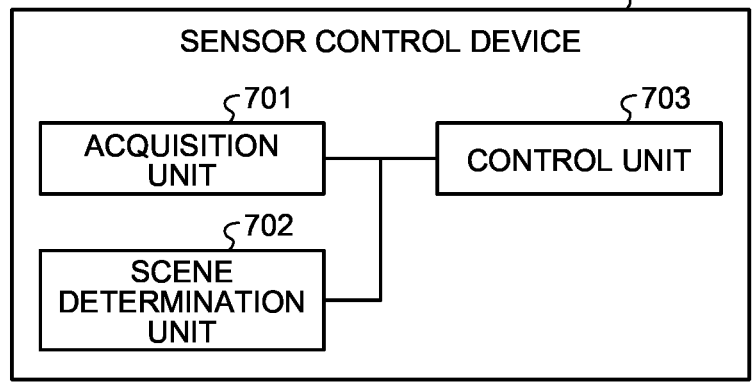
FIG. 3 is a block diagram illustrating an example of a function provided in the sensor control device according to an embodiment.

FIG. 3 is a block diagram illustrating an example of a function provided in the sensor control device 70 according to the first embodiment. As illustrated in FIG. 3, the sensor control device 70 of the present embodiment includes an acquisition unit 701, a scene determination unit 702, and a control unit 703.

The acquisition unit 701 acquires distance information indicating a distance measured by the sonars 21 and 22 or the radar 17, vehicle speed information indicating the speed of the vehicle 1, image data obtained by the image pickup device 16, or location information indicating the location of the vehicle 1.

The image data is an example of image information in the present embodiment. The acquisition unit 701 can acquire image data directly from the image pickup device 16 or via the vehicle control device 50 or can acquire a result of pedestrian detection performed by the vehicle control device 50.

While there is a known technique for processing the image data to detect an image representation of a pedestrian and estimating the pedestrian's position, specifying the presence or absence of a pedestrian using image processing has an issue in the precision. Such a precision issue leads to a reliability issue and an accuracy issue. Specifying a pedestrian using image processing is to determine that an image representation of a pedestrian is detected if there is an image representation having a similar contour line to that of a dictionary image of the pedestrian in the image. In one example, if the contour line of a puddle is similar to that of a dictionary image, it is determined that there is a pedestrian. In addition, for example, if the contour line is not similar to that of the dictionary image, such as a child riding a tricycle, it is determined that there is no pedestrian. In other words, there is an issue in the reliability of the determination of the presence or absence of a pedestrian, which makes it difficult to say that the precision is high.

The distance to the pedestrian obtained by image processing is specified by estimating the position of the tip of the pedestrian's leg as the position of the foot and performing the conversion to obtain the distance, assuming that the pedestrian's foot is located on the horizontal road surface. However, for example, if the shadow of a pedestrian's foot is mistakenly recognized for part of the foot, the estimation of the position of the foot will be inaccurate, or if the road surface is sloped, an error will occur in the conversion to the distance. In other words, there is an issue in the accuracy of the distance to the pedestrian, which makes it difficult to say that the precision is high.

The object detection apparatus according to the present embodiment does not determine whether or not the object is a pedestrian. However, the object detection apparatus is capable of detecting a pedestrian or the like with high precision using sonar, and the image data is used for the determination of a scene. Moreover, the inventor is not intended to deny the detection of a pedestrian using the image processing. In one example, in a case where the position of an object estimated to be a pedestrian using the image processing roughly matches the position of an object specified by the sonar, it can be determined that there is a pedestrian at the position specified by the sonar, and deceleration or braking is performed accordingly.

The acquisition unit 701 acquires information regarding the speed of a vehicle from the speed control device 40 or the vehicle control device 50.

The location information indicating the location of the vehicle 1 is information in which the location of the vehicle 1 is specified on a map. The location information is, for example, the information specified by the vehicle control device 50 on the basis of information acquired from the GPS device or the like and map information stored in a storage unit of the vehicle control device 50. Moreover, the technique of generating and acquiring the location information is not limited to a particular one, and known techniques can be employed.

The scene determination unit 702 determines a scene in which the vehicle 1 is placed on the basis of at least one of the distance information, the vehicle speed information, the image data, and the location information acquired by the acquisition unit 701. The scene determination unit 702 is an example of a scene determination unit in the present embodiment.

In the present embodiment, the term "scene" is construed to include a situation in which the vehicle 1 is placed or a situation of the environment around the vehicle 1. In one example, the scene determination unit 702 determines whether the scene in which the vehicle 1 is placed corresponds to which one of a crosswalk approaching scene, a preceding-vehicle approaching scene, a vehicle-pedestrian mixed scene, and a normal scene.

The crosswalk approaching scene is a scene in which the vehicle 1 is approaching a crosswalk. The preceding-vehicle approaching scene is a scene in which the vehicle 1 is approaching and following the preceding vehicle. The vehicle-pedestrian mixed scene is a scene in which there is a high possibility that vehicles and pedestrians coexist around the vehicle 1. In addition, the normal scene is a scene that does not correspond to any of the crosswalk approaching scene, the preceding-vehicle approaching scene, and the vehicle-pedestrian mixed scene, and is also referred to as the other scene. Details of the respective scenes will be described later.

The control unit 703 sets a high-sensitivity area where the sensitivity of the sonar 21 or 22 for detecting the reflected waves is temporarily increased, or the control unit 703 changes at least one of emission interval and emission sequence in which ultrasonic waves are emitted. Such setting or change is performed on the basis of a scene determination result obtained by the scene determination unit 702. Moreover, changing the emission sequence includes disabling the emission of part of the sonars 21 and 22.

The sensitivity of the sonars 21 and 22 to detect the reflected waves varies in accordance with a detection threshold value, which is a condition that the reflected waves received by the sonars 21 and 22 are determined to be the reflected waves reflected by an obstacle. In addition, the sensitivity also varies by changing an amplification factor of the reception circuit of the sonars 21 and 22. The detection threshold value and the amplification factor will be described later with reference to FIG. 5. In addition, the emission interval in which ultrasonic waves are emitted is the time interval from the emission of ultrasonic waves by either the sonar 21 or the sonar 22 to the subsequent emission of ultrasonic waves by either the sonar 21 or the sonar 22.

Further, the emission sequence in which ultrasonic waves are emitted is the order of the sonars 21 and 22 to emit ultrasonic waves. In a case where the sonars 21 and 22 emits at the same time or at short time intervals, interference occurs in which multiple reflected waves are received from one obstacle while being superimposed, which makes it difficult to specify a distance on the basis of the reception timing of the reflected waves. Thus, interference between the reflected waves caused by the ultrasonic waves emitted by another sonar is prevented by allowing the control unit 703 to control the emission time in such a way that the emission timings of the ultrasonic waves from the respective sonars 21 and 22 do not overlap with or be close to each other. Further, if the vehicle 1 is stopped or traveling at a low speed, the sonars 21 and 22 uniformly detect an obstacle in multiple directions in which they are directed, so that the sonars 21 and 22 all emit ultrasonic waves at the same frequency and at the same time interval in accordance with a fixed sequence. However, if the vehicle speed is relatively high, a frequency of detection of the traveling direction of the vehicle 1 is necessary to increase. Even if the corner sonars 21c and 21d detect an obstacle in the direction to which they are directed, it is considered that the vehicle 1 is less likely to collide with the obstacle, so sometimes, the change of the emission sequence in which the emission from the corner sonars 21c and 21d is disabled but the emission from the central sonars 21a and 21b is activated is performed.

The acquisition unit 701, the scene determination unit 702, and the control unit 703 are implemented by a program executed by the CPU 11A of the sensor control device 70. The program executed by the sensor control device 70 of the present embodiment is provided in the form recorded on a computer-readable recording medium, such as a CD-ROM, a flexible disk (FD), a CD-R, or a digital versatile disc (DVD), as a file in an installable format or an executable format. In addition, the program executed by the sensor control device 70 of the present embodiment can be stored on a computer connected to a network such as the Internet or provided by downloading via the network. In addition, the program executed by the sensor control device 70 of the present embodiment can be the form capable of being provided or distributed via a network such as the Internet. In addition, the program executed by the sensor control device 70 of the present embodiment can be provided in the form in which the program is previously incorporated into the ROM 11B or the like.

Moreover, the description in the present embodiment is given that the control unit 703 is a functional component implemented by software, but the "control unit" can cover functional components other than that implemented by the software. In one example, the entire sensor control device 70 can be used as an example of the "control unit", or the CPU 11A of the sensor control device 70 can be used as an example of the "control unit". Moreover, the entire sensor control device 70 also can be used as an example of the "scene determination unit", or the CPU 11A of the sensor control device 70 can be used as an example of the "scene determination unit". Alternatively, the vehicle control device 50 can be used as an example of the "scene determination unit", or the CPU of the vehicle control device 50 can be used as an example of the "scene determination unit".

Moreover, the scene determination unit 702 can function as a device other than the sensor control device 70, for example, the vehicle control device 50. In addition, in a case where the scene determination unit 702 functions as the vehicle control device 50, the vehicle control device 50 also includes the function of the acquisition unit 701 described above. In this case, the acquisition unit 701 of the sensor control device 70 can acquire the scene determination result obtained by the scene determination unit 702 from the vehicle control device 50.

Figure 4:
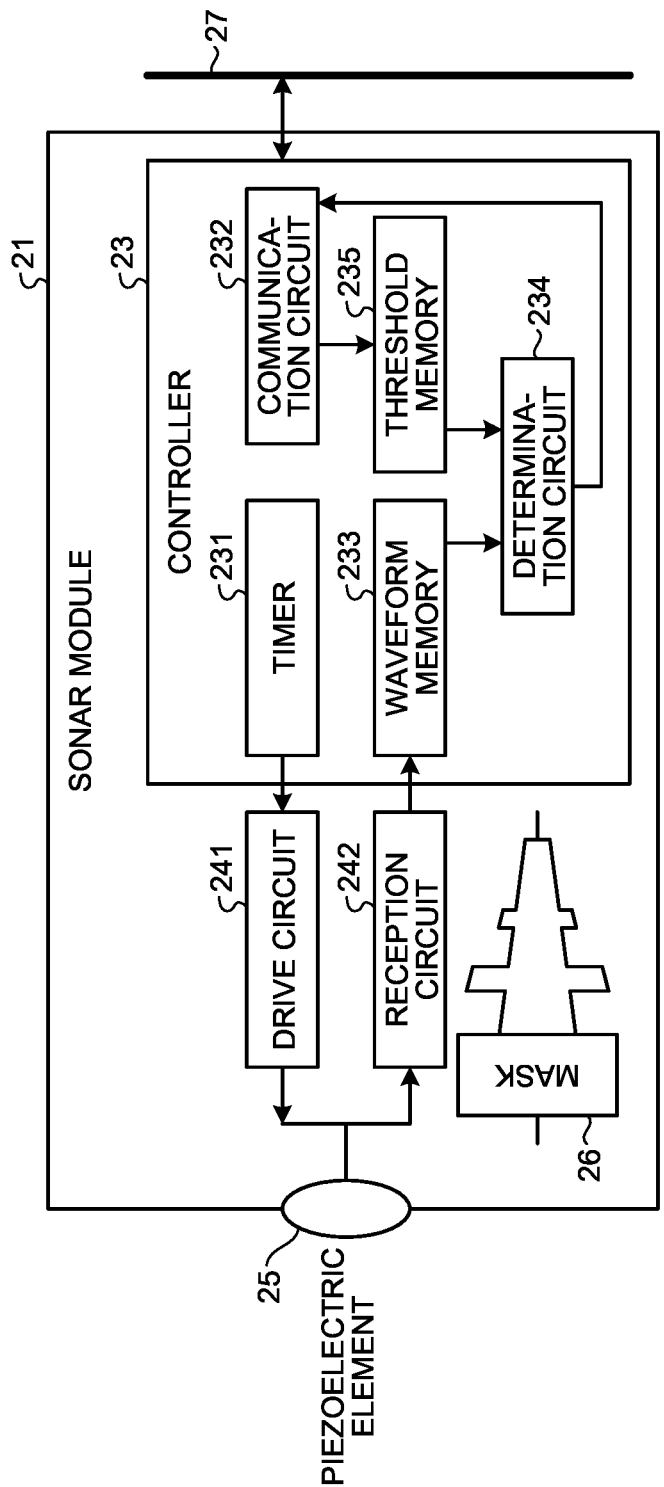
FIG. 4 is a diagram illustrating an exemplary configuration of sonar according to an embodiment.

The sonars 21 and 22 will be described in detail. FIG. 4 is a diagram illustrating an exemplary configuration of the sonars 21 and 22 according to the first embodiment. The sonars 21 and 22 are also referred to as individual sonar modules. The sonar module includes a controller 23, a drive circuit 241, a reception circuit 242, a piezoelectric element 25, and a mask 26. In addition, the controller 23 includes a timer 231, a communication circuit 232, a waveform memory 233, a determination circuit 234, and a threshold memory 235. In addition, the controller 23 is connected to the sensor control device 70 via a transmission line 27. Moreover, the controller 23 can be also connected to the vehicle control device 50 via the transmission line 27.

The sonars 21 and 22 emit ultrasonic waves by applying a voltage to the piezoelectric element 25. In one example, the controller 23 controls the drive circuit 241 such that the drive circuit 241 applies a voltage of 50 kilohertz (kHz) to the piezoelectric element 25. The piezoelectric element 25 emits ultrasonic waves with the same frequency. The emitting ultrasonic waves are pulse-shaped. The pulse-shaped ultrasonic waves, when hitting a road surface or an obstacle, are reflected, and some of them are returned to the sonars 21 and 22.

The piezoelectric element 25 then converts the sound pressure of the returned reflected waves into a voltage. The piezoelectric element 25 is an example of a conversion element in the present embodiment. The reception circuit 242 amplifies the voltage converted from the sound pressure by the piezoelectric element 25, rectifies it, and converts the result into sound wave reception intensity. The waveform indicating a change in the converted sound wave reception intensity over time is referred to as an "echo waveform". The reception signal and the amplified reception signal are an alternating current, and the sound wave reception intensity is a rectified version of the amplified reception signal, so there is a difference between alternating current and direct current. However, both are obtained by processing the reception signal, so that the reception signal and the amplified reception signal are sometimes referred to as "reception signal" in the collective term, regardless of whether the signal is alternating current or direct current. The reception circuit 242 includes an amplification circuit (not illustrated) that amplifies the voltage converted from the sound pressure by the piezoelectric element 25 (or amplifier). The reception circuit 242 or the amplification circuit included in the reception circuit 242 is an example of an amplification circuit in the present embodiment.

Figure 5:
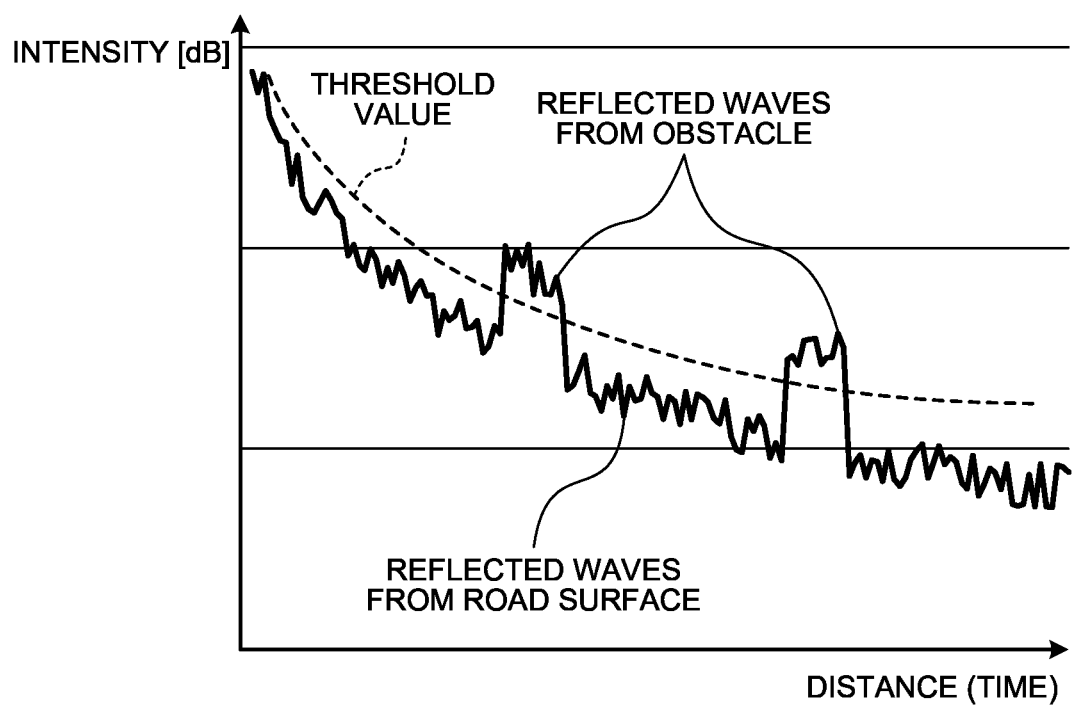
FIG. 5 is a graph illustrating an example of an echo waveform according to an embodiment.

FIG. 5 is a graph illustrating an example of an echo waveform according to the first embodiment. In the graph illustrated in FIG. 5, the horizontal axis indicates distance and time, and the vertical axis indicates intensity (dB), that is, the sound wave reception intensity. The echo waveform is stored in the waveform memory 233 of the controller 23.

The farther the object is, the longer it takes for the ultrasonic waves to be emitted from the sonars 21 and 22 and returned to the sonars 21 and 22, so it is possible convert the length of time from emission to reception of the waves into the length of the distance between the sonars 21 and 22 and the object. The sonars 21 and 22 are provided at the end portions of the vehicle 1, so that the distance between the sonars 21 and 22 and the object is substantially the same as the distance between the vehicle 1 and the object. The distance between the sonars 21 and 22 and the object can be expressed herein as the distance between the vehicle 1 and the object.

An object that obstructs the traveling of the vehicle 1 among objects that reflect ultrasonic waves is referred to as an obstacle, and an object that does not obstruct the traveling of the vehicle is referred to as an unobstructed object. The unobstructed object includes irregularities such as small stones on the road and stepped parts on the road surface, or even the road surface itself. The reflected waves from such an unobstructed object are prevented from being detected by setting a threshold value of the sound wave reception intensity. The threshold value of sound wave reception intensity is also referred to as a detection threshold value. In addition, the threshold value of the sound wave reception intensity can be simply referred to as a threshold value. The detection threshold value is stored in the threshold memory 235 of the controller 23. In addition, the detection threshold value can be changed by the control unit 703 of the sensor control device 70.

The reflection that is less than or equal to the detection threshold value is excluded from a target to be detected being considered as the reflected waves caused by the unobstructed object. In addition, ultrasonic waves are rapidly attenuated in the air, so that the height of the echo waveform, that is, the intensity of the reflected waves decreases as the distance between the vehicle 1 and the object increases. Thus, as illustrated in FIG. 5, the detection threshold value is set in such a way that the longer the distance from the vehicle 1, the smaller the detection threshold value. In addition, the distance from the vehicle 1 corresponds to the length of time from the emission of ultrasonic waves to the reception of reflected waves caused by the ultrasonic waves, so that the detection threshold value decreases as the length of time from the emission of ultrasonic waves to the reception of reflected waves caused by ultrasonic waves increases. In other words, the detection threshold value is not a single numerical value but a plurality of values associated with different distance measurements, and it is represented by a polygonal line or a curve on the echo waveform.

If the distance measurements from the vehicle 1 have identical values, the lower the detection threshold value, the easier it is to determine an obstacle. Thus, the lower the detection threshold value, the higher the sensitivity of the sonars 21 and 22. In addition, the echo waveform also varies in dependence on the amplification factor in the reception circuit 242, so that the amplification factor is also related to the sensitivity of the sonars 21 and 22. In the case where the amplification factor is fixed, the longer the distance from the vehicle 1, the more the sound waves are attenuated, so that the echo waveform gets a downward-sloping waveform. However, by increasing the amplification factor in the reception circuit 242 upward to the right, if the attenuation rate of the sound waves is offset, it can be compensated such that the echo waveform becomes a substantially horizontal waveform. In this way, in the case where the attenuation rate of the sound waves is compensated by the amplification factor, the detection threshold value is also set to be substantially horizontal.

The pulse waveform showing the reflected waves from the obstacle on the echo waveform has a width. The pulse width corresponds to the "range of the difference in the distance between the sonar and different parts of the obstacle". Thus, the conversion of the time until the rise of the pulse for the echo waveform into the distance makes it possible to calculate the shortest distance between the sonar (or from the vehicle 1) and the obstacle.

The determination circuit 234 of the controller 23 detects an object around the vehicle 1 by comparing the amplified reception signal and the detection threshold value stored in the threshold memory 235. More precisely, the amplified reception signal is rectified to obtain the sound wave reception intensity and then compared with the detection threshold value, which is sometimes described that the reception signal is compared with the detection threshold value for the simplification of description. The determination circuit 234 determines that an obstacle is detected in the case where reflected waves with intensity exceeding the detection threshold value are received. The determination circuit 234 transfers the detection of the obstacle and the distance information to the communication circuit 232. The distance information indicates the distance between the vehicle 1 and the obstacle. The communication circuit 232 transmits the detection of the obstacle and the distance information, which indicates the distance between the vehicle 1 and the obstacle, to the vehicle control device 50 and the sensor control device 70 via the transmission line 27. The determination circuit 234 is an example of a detection circuit in the present embodiment.

While FIG. 5 illustrates, as a graph, results obtained by receiving the echo waveform corresponding to one-time emission, the sonars 21 and 22 repeatedly emit ultrasonic waves at time intervals. The emission interval of ultrasonic waves from the sonars 21 and 22 is also referred to as a detection interval. The detection interval is controlled by the control unit 703 of the sensor control device 70.

Figure 6:
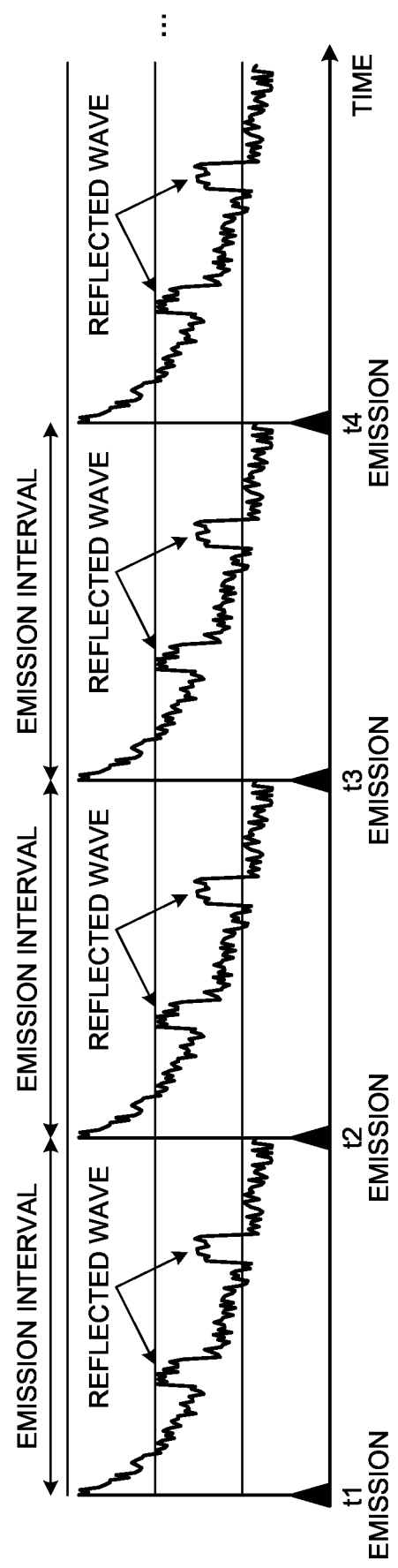
FIG. 6 is a diagram illustrating an example of a detection interval according to an embodiment.

FIG. 6 is a diagram illustrating an example of a detection interval according to the first embodiment. In the example illustrated in FIG. 6, the detection interval is a time interval between emission timing t1 and emission timing t2, between emission timing t2 and emission timing t3, and between emission timing t3 and emission timing t4, which are timings at which ultrasonic waves are emitted.

In a case where another vehicle equipped with the sonar is present around the vehicle 1, the sonars 21 and 22 of the vehicle 1 can sometimes receive the ultrasonic waves emitted by the sonar of the other vehicle and the reflected waves caused by the ultrasonic waves. Thus, the sonars 21 and 22 get measures against erroneous detection, such as determining that there is an obstacle only in the case where the reflected waves having the same time from emission to reception are received three times in a row, thereby avoiding erroneous detection. However, the shape of the pedestrian varies, so that there are cases where the intensity of the reflected waves is not fixed, resulting in no detection due to such measures against erroneous detection.

Even when no pedestrian is detected sometimes, the probability of detection three times or more in a row increases if the number of times of detection is large. Thus, it is advantageous in the detection of a pedestrian to increase the number of detection tasks by shortening the detection interval. However, the shortened detection interval leads to a shorter detectable distance. In one example, in a case where the sound velocity is 340 meters per second (m/s) and the sound waves reflected by an obstacle return 20 milliseconds (msec) after emission, it is found out that there is an obstacle at a distance of 340 m/s×0.02 s÷2=3.4 m. In this example, assuming that the emission interval is 20 msec, the sound waves reflected at a position farther than 3.4 meters (m) are hidden by the emitted sound waves, so only the range of less than 3.4 meters can be detected. However, if the emission interval is widened to 40 msec, an obstacle at a distance of up to 6.8 meters can be detected. In other words, the time length of the emission interval is proportional to the length of the distance at which an obstacle is detectable.

In the present embodiment, the detectable distance limited by such an emission interval is referred to as a "measurable distance limited by emission interval". The measurable distance limited by the emission interval is obtained by the formula "measurable distance limited by emission interval=sound velocity×emission interval÷2".

The measurable distance limited by the emission interval is typically set in accordance with the standard measurable distance that is detectable by the sonars 21 and 22. The standard measurable distance is, for example, the detection distance disclosed in the specifications as the performance of the sonar and is the upper limit of the detectable distance under predetermined conditions. In other words, in a case where the emitted sound waves are reflected by a typical object such as another vehicle, the standard measurable distance that can receive the reflected waves of the predetermined intensity or higher is set to be the same as the measurable distance limited by the emission interval. In a case where the standard measurable distance and the measurable distance limited by the emission interval are different, the smaller one of the standard measurable distance and the measurable distance limited by the emission interval will be an efficient measurable distance. In the present embodiment, the smaller one of the standard measurable distance and the measurable distance limited by the emission interval is hereinafter set as a measurable distance d1.

Figure 7:
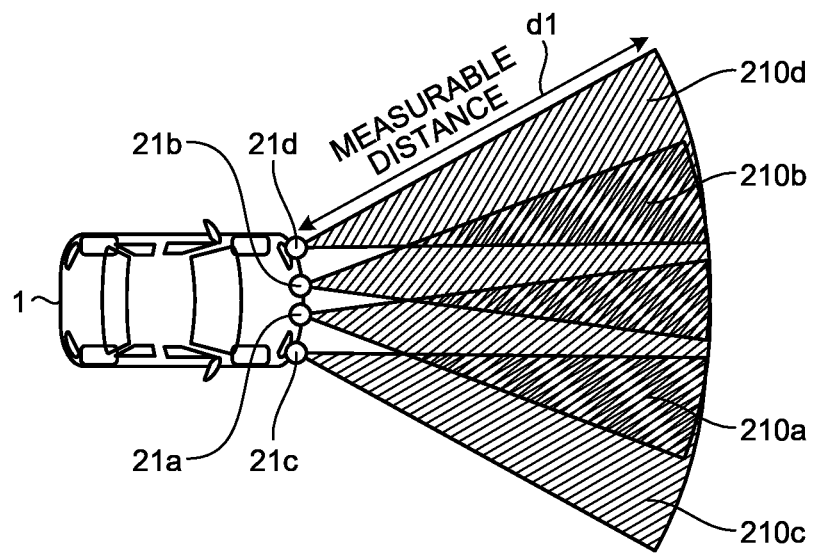
FIG. 7 is a diagram illustrating an example of a measurable distance of sonar in an embodiment.

FIG. 7 is a diagram illustrating an example of a measurable distance of the sonar 21 in the first embodiment. As illustrated in FIG. 7, the distance between the vehicle 1 and the end edge of the detection range 210 of the sonar 21 is the measurable distance d1 at which the sonar 21 is capable of detecting an obstacle and measuring the distance to the obstacle.

In one example, in a case where the sound velocity is 340 m/s and the emission interval is 60 msec, the measurable distance limited by the emission interval is approximately 10 meters, which is obtained by the above-mentioned formula "measurable distance limited by emission interval=sound velocity×emission interval÷2". Moreover, while the value of 10 meters is an example, it generally corresponds to a distance detectable by the sonars 21 and 22, i.e., a standard measurable distance at which the reflected waves with predetermined intensity can be received when the emitted sound waves are reflected by a typical object. In other words, in this example, the measurable distance limited by the emission interval and the standard measurable distance are identical, so measurements of the measurable distance d1 of both are equal. In this example, if the emission interval is shortened, the measurable distance limited by the emission interval decreases in proportion to the emission interval, resulting in the measurable distance d1 of less than 10 meters. This value is shorter than the standard measurable distance, so the shorter the measurable distance, the less favorable the setting can be. Conversely, the lengthened emission interval increases the measurable distance limited by the emission interval in proportion to the emission interval, but the reflected waves at a distance exceeding the standard measurable distance weaken and fail to be received. Thus, the measurable distance d1 remains at 10 meters, so the shorter the frequency of the detection, the less favorable the setting can be. In this way, the measurable distance d1 is limited by the standard measurable distance and so does not increase even by an excessively lengthened detection interval. Thus, the detection interval is generally set such that the measurable distance limited by the emission interval is identical to the standard measurable distance. In the present embodiment, in the case of the "normal scene", the sensor control device 70 sets the emission interval such that the measurable distance limited by the emission interval is identical to the standard measurable distance, which is similar to the typical setting.

The setting of the detection threshold value will be described. In the present embodiment, in the case of the "normal scene", the sensor control device 70 does not perform a particular operation of lowering the detection threshold value of the sound wave reception intensity. In this regard, the fact that no specific operation of lowering the detection threshold value is performed indicates that the detection threshold value is set according to the attenuation curve of the sound waves and is not lowered in accordance with the setting. In this case, as described with reference to FIG. 5, the reflected waves are attenuated according to the attenuation curve in accordance with the distance, and the intensity is smaller as the reflection is farther away. Thus, the detection threshold value is set in such a way that the value decreases according to the attenuation curve of the sound waves in accordance with the time from the emission corresponding to the distance. In this way, in the case where the detection threshold value is set to compensate for the attenuation rate of the sound waves, the sensitivity of the sonars 21 and 22 is fixed over the entire detection range.

Figure 8:
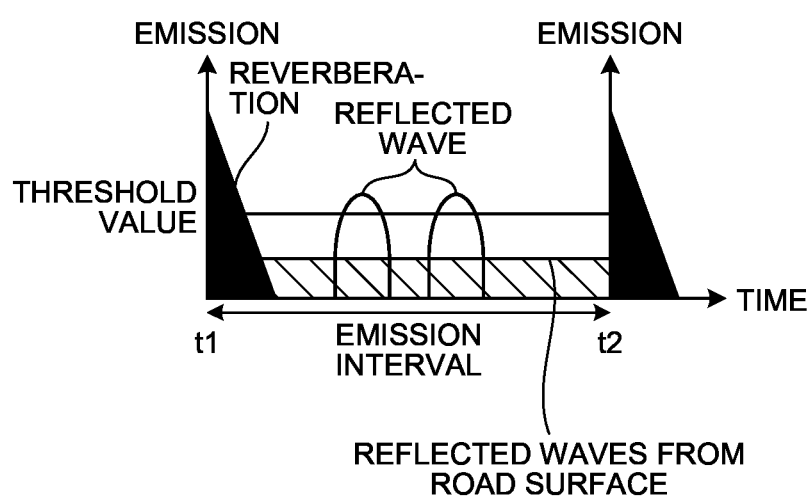
FIG. 8 is a diagram schematically illustrating an example of detection of an obstacle in a normal scene according to an embodiment.

FIG. 8 is a diagram schematically illustrating an example of detection of an obstacle in a normal scene according to the first embodiment. FIG. 8 illustrates, unlike the graph of the echo waveform of FIG. 5, the compensation to make the graph horizontal by offsetting the attenuation rate of the reflected waves with the distance by the amplification factor. In this case, the influence caused by attenuation of the reflected waves with the distance is offset by the amplification factor, so that the detection threshold value is fixed in the normal scene. In this way, even in the case where the amplification factor is controlled to compensate for the attenuation rate of the sound waves and the detection threshold value is fixed, the sensitivity of the sonars 21 and 22 is fixed over the entire detection range. The sensitivity that is fixed over the entire detection range in the "normal scene" is sometimes referred to as a "normal sensitivity".

Moreover, in the case of the "normal scene", the sensor control device 70 does not perform a specific change for the emission sequence of the four sonars 21 from the initial setting. The initially set emission sequence is, for example, the first front corner sonar 21c, the first front central sonar 21a, the second front central sonar 21b, and the second front corner sonar 21d in this order. Assuming that the emission interval is 60 msec, it takes 240 msec to complete one cycle of the emission of the four sonars. In one example, an echo from an obstacle in front of the vehicle 1 is detectable in the case where the first front central sonar 21a and the second front central sonar 21b emit ultrasonic waves, and assuming that there is a condition of "determining as an obstacle upon detecting the obstacle twice in a row", it takes 360 msec to determine the obstacle.

Moreover, at the vehicle speed of 20 kilometers per hour (km/h), the vehicle advances 2 meters during 360 msec until it is determined to be an obstacle, and even if it is determined to be an obstacle and emergency braking is applied, the vehicle advances further until it comes to a complete stop. The increased vehicle speed makes the time until braking starts longer and makes the braking distance from a braking point to a stopping point also longer with the vehicle speed, resulting in failing to stop right before the obstacle detected by the sonar. In this way, there is an upper limit to the vehicle speed at which a collision can be avoided using the sonars 21 and 22, so that the sensor control device 70 deactivates the sonars 21 and 22 when the vehicle speed exceeds a threshold value. This threshold value is referred to as sonar operation threshold value. The sonar operation threshold value is, for example, 20 km/h but not limited to this value.

Moreover, in the case of the "normal scene", the sensor control device 70 sets the detection threshold value according to the attenuation of the reflected waves with the distance and sets the sensitivity in the entire detection range to the normal sensitivity. In changing the scene from the "normal scene" to another scene, reduction of the detection threshold value in a specific range makes it possible to increase the sensitivity of the sonars 21 and 22 in the specific range. The term "range" herein indicates the range of a space defined by the distance from the vehicle 1. The range in which the sensitivity is higher than the normal sensitivity is referred to as a high-sensitivity area.

Figure 9:
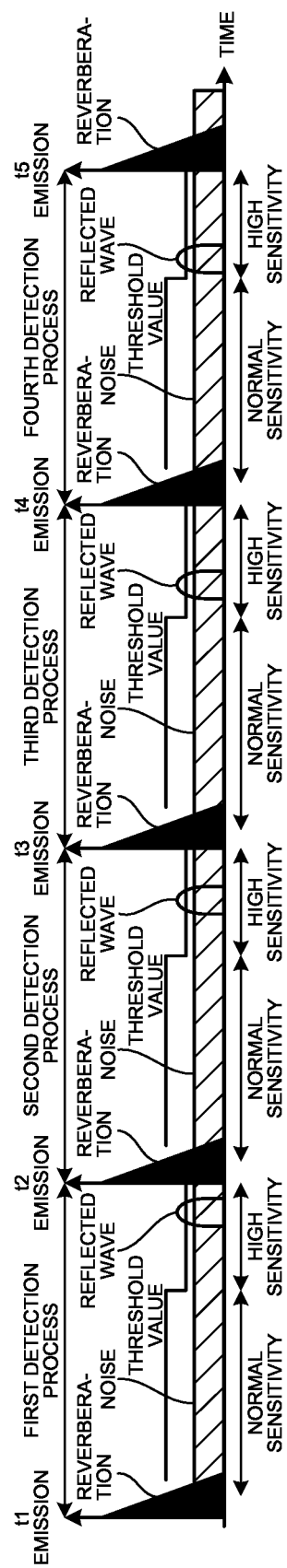
FIG. 9 is a diagram illustrating an example of a change in sensitivity according to an embodiment.

FIG. 9 is a diagram illustrating an example of a change in sensitivity according to the first embodiment. FIG. 9 illustrates the compensation to make the graph horizontal by offsetting the attenuation of the reflected waves with the distance by amplification, which is similar to FIG. 8. In the example illustrated in FIG. 9, part of the range is set to the high-sensitivity area where the detection threshold value is lower than that of the other range. Then, an object that is undetected as an obstacle because the intensity of the reflected waves does not exceed the threshold value in the normal sensitivity range is detected as an obstacle because it exceeds the detection threshold value in the high-sensitivity area.

The determination by the control unit 703 of the sensor control device 70 is performed on the basis of: the scene in which the scene determination unit 702 determines whether the normal sensitivity area or the high-sensitivity area. The normal sensitivity area is an area in which the sensitivity for detecting the reflected waves is normal, and the high-sensitivity area is an area in which the sensitivity for detecting the reflected waves is high.

In addition, the object detection processing performed by the sonars 21 and 22 will be described with reference to FIG. 9. The time from when the ultrasonic waves are emitted to when the reflected waves are received is a flight time (FT) until the emitted ultrasonic waves are reflected by the object and returned. Dividing the flight time by the sound velocity and further halving it gives the distance between the sonars 21 and 22 and the object. The FT can be specified by setting the time when the reflected waves are received as the time when the reflected waves are detected beyond the threshold value to calculate the distance between the FT and the object. In the case where there are two or more reflected wave signals as illustrated in FIG. 8, the processing of calculating the distance from the FT is performed for each of the reflected wave signals. A process in which this processing continues from the first emission to the subsequent is referred to as one-cycle detection processing.

The sonars 21 and 22 repeatedly perform the detection processing such as first to fourth detection processes illustrated in FIG. 9. In addition, processing, which is called tracking, of calculating the distance to the object and of tracing a change of distance information is executed for each time the detection processing is performed.

Moreover, a component that executes the tracking is not limited to a particular one, but for example, it can be executed by the vehicle control device 50. Alternatively, the sensor control device 70 or other devices included in the in-vehicle system 100 can execute the tracking.

In one example, if the speed at which the distance of the object decreases, that is, an approaching speed is calculated by the tracking and the vehicle speed of the vehicle 1 and the approaching speed match within the error range, it is possible to determine that the object is not moving and is a stationary object. In the example illustrated in FIG. 9, the detection processing makes it to be found out that the FT from the emission of ultrasonic waves to the return of reflected waves is getting shorter, and the distance between the object and the vehicle 1 is getting shorter.

The processing using the principle of trilateration of each FT obtained when the sound waves reflected by one object are received by multiple sonars allows information regarding the coordinates of the object to be obtained. The tracing performed on these coordinates is also included in the tracking. In addition, an obstacle at the same height as the sonars 21 and 22 and an object on the road at a position lower than the sonars 21 and 22 are different in how the distance detected upon approaching by the vehicle 1 varies. In one example, in a case where there is a small object on the road that the vehicle 1 does not necessarily need to be avoided, a height difference occurs between the sonar and the object, unlike a case where the vehicle 1 approaches a vertical wall. This height difference causes a phenomenon in which the approaching speed defined by the linear distance decreases with the approach of the sonar to the object. Finding out this phenomenon can lead to understanding that the height of the object does not reach the vehicle body. The tracking also makes it possible to discriminate between obstacles that are likely to require collision avoidance and objects on the road that are not likely to require collision avoidance on the basis of how the distance detected when the vehicle 1 approaches varies.

In the example illustrated in FIG. 9, the high-sensitivity area is a scope of the detection range 210 with the detection threshold value lower than that of the normal-sensitivity area. In the high-sensitivity area, the object is more likely to be detected by the sonars 21 and 22 than in the normal-sensitivity area. While FIG. 9 illustrates that the lowered detection threshold value increases the sensitivity in the high-sensitivity area, the increased amplification factor can be made to increase the sensitivity in the high-sensitivity area. Although not illustrated in the graph, the sensitivity can increase by making the amplification factor in the high-sensitivity area larger than that in a non-high-sensitivity area, with the detection threshold value remaining unchanged between the high-sensitivity area and the non-high-sensitivity area. Alternatively, the sensitivity can be made to increase by either or both changing the detection threshold value and changing the amplification factor. In one example, at the near end of the high-sensitivity area, that is, the end closer to the sonars 21 and 22 in the high-sensitivity area, the sensitivity can increase only by changing the detection threshold value. At the far end of the high-sensitivity area, that is, the end far from the sonars 21 and 22 in the high-sensitivity area, the sensitivity can increase only by changing the amplification factor. The sensitivity can increase by either or both changing the detection threshold value and changing the amplification factor between the near end and the far end of the high-sensitivity area.

Whatever method is used, it can be expected in the high-sensitivity area to detect weak echoes reflected by a pedestrian, but even echoes from unobstructed objects such as road surface irregularities sometimes exceed the detection threshold value. Such detection of echoes from an object that is not likely to require collision avoidance is referred to as unnecessary detection. The sonars 21 and 22 also receive interference waves such as ultrasonic waves emitted by the sonar of another vehicle and noise generated by the tires of the traveling vehicle 1 or another vehicle, and the like. Such unnecessary detection occurs even when such interference waves or noise exceeds the detection threshold value.

The tracking for evaluating the consistency of location information obtained by multiple detection processing operations is performed to discriminate whether it is unnecessary detection, that is, whether it is an echo from an object that is not likely to require collision avoidance. Echoes for which consistent location information fails to be obtained are determined to be the unnecessary detection and then discarded, and no further processing is performed. Conversely, it is not possible to determine whether it is unnecessary detection and discard it until the tracking is done. Thus, the tracking including unnecessary detection is performed.

Upon the tracking, in one example, the vehicle control device 50 calculates distance information from the reception time of the echoes detected for the respective sonars 21 and 22 and calculates coordinate information from a combination of the distance information items starting from the respective sonars 21 and 22 using the principle of trilateration. In this event, the increased number of distance information items increases the number of combinations of the distance information items in proportion to the square of the number of echoes. Such an increase in the number of combinations of the distance information items increases the number of coordinate information items. Furthermore, all the latest coordinate information items are compared with all the coordinate information items calculated in the previous detection, leading to performing identity determination. The identity determination is to determine whether or not they are estimated as the coordinate information regarding identical objects. If the identity determination is performed by a round-robin cross-check, the number of times the identity determination is performed equals the square of the number of coordinate information items to be checked.

In other words, the larger the number of detections, the higher the load of the tracking processing including the identity determination exponentially. Thus, if the number of detection tasks is too large, the load caused by the tracking processing can exceed the processing capacity of the processor of the CPU or the like included in the devices such as the vehicle control device 50, resulting in the possibility that the tracking processing is not be completed in time.

In one example, the widened high-sensitivity area increases the probability that a weak echo from a pedestrian is detectable in the high-sensitivity area, but at the same time, increases the number of unnecessary detection tasks. Thus, the excessively widened high-sensitivity area will cause the number of unnecessary detection tasks to exceed the limit of the number that is trackable by the processing capacity of the processor. Thus, it is difficult to set all the detection ranges 210 and 220 of the sonars 21 and 22 as high-sensitivity areas. In other words, the width of the high-sensitivity area has a practical limit, so it is necessary to set the high-sensitivity area within the range of this practical limit. In the present embodiment, the control unit 703 in the sensor control device 70 sets a high-sensitivity area in accordance with the scene, thereby preventing the number of unnecessary detection tasks from exceeding the limit of the trackable number and improving the precision of the detection of a pedestrian.

The details of the processing for each scene in the present embodiment will be described. The crosswalk approaching scene is first described.

Figure 10:
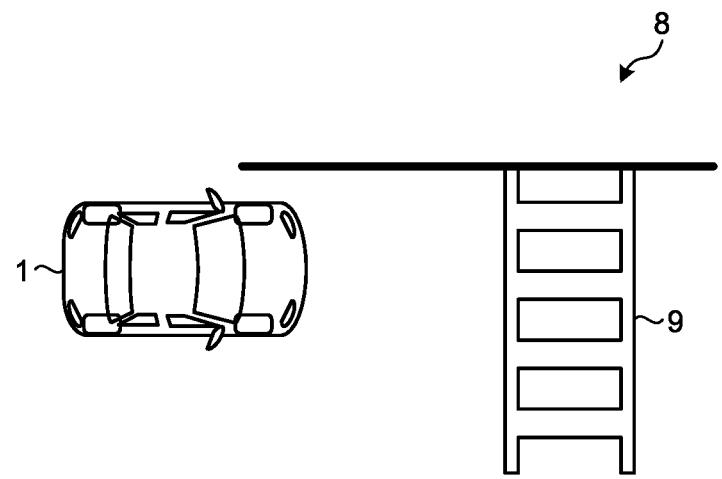
FIG. 10 is a diagram illustrating an example of a crosswalk approaching scene according to an embodiment.

FIG. 10 is a diagram illustrating an example of a crosswalk approaching scene according to the first embodiment. As illustrated in FIG. 10, the crosswalk approaching scene is a situation in which the vehicle 1 is approaching a crosswalk 9. Moreover, in the example illustrated in FIG. 10, it is assumed that the vehicle 1 is moving forward toward the crosswalk 9 at the speed equal to or lower than the sonar operation threshold value. In addition, in the example illustrated in FIG. 10, the front left side of the vehicle 1 is close to a sidewalk 8, and the front right side of the vehicle 1 is close to the center side of the roadway.

The condition for determining by the scene determination unit 702 that the situation where the vehicle 1 is placed is the "crosswalk approaching scene" is, for example, any one of the following conditions (1), (2), and (3). The condition (1) is the detection of a situation in which the crosswalk 9 on the road surface in the traveling direction of the vehicle 1 is shown in the image data captured by the image pickup device 16. The condition (2) is a situation in which the location information of the vehicle 1 acquired from the GPS device or the like approaches the position of the crosswalk 9 included in the map information. The condition (3) is the estimation of the existence of a crosswalk using a pedestrian traffic light or the like. Moreover, the scene determination unit 702 can determine that the scene is the crosswalk approaching scene if one or more of the conditions (1) to (3) are satisfied or can combine the conditions (1) to (3) as a determination condition.

The map information used in the condition (2) can be stored in, for example, a storage unit of the vehicle control device 50 or a navigation system provided separately from the vehicle control device 50, or the vehicle control device 50 can include the navigation system. The map information can be used regardless of its location so long as it shows the positional relationship between the location of the vehicle 1 and the crosswalk in the vicinity of the vehicle 1. In addition, the map information can be, for example, a digital map for the navigation system.

Moreover, the determination condition for the crosswalk approaching scene is not limited to matters mentioned above. In addition, the determination condition for the crosswalk approaching scene can vary in accordance with the combination with the determination condition for the preceding-vehicle approaching scene or the vehicle-pedestrian mixed scene as described later.

Moreover, the scene determination unit 702 can use known image processing techniques in detecting the crosswalk 9 on the basis of the image data captured by the image pickup device 16.

Figure 11:
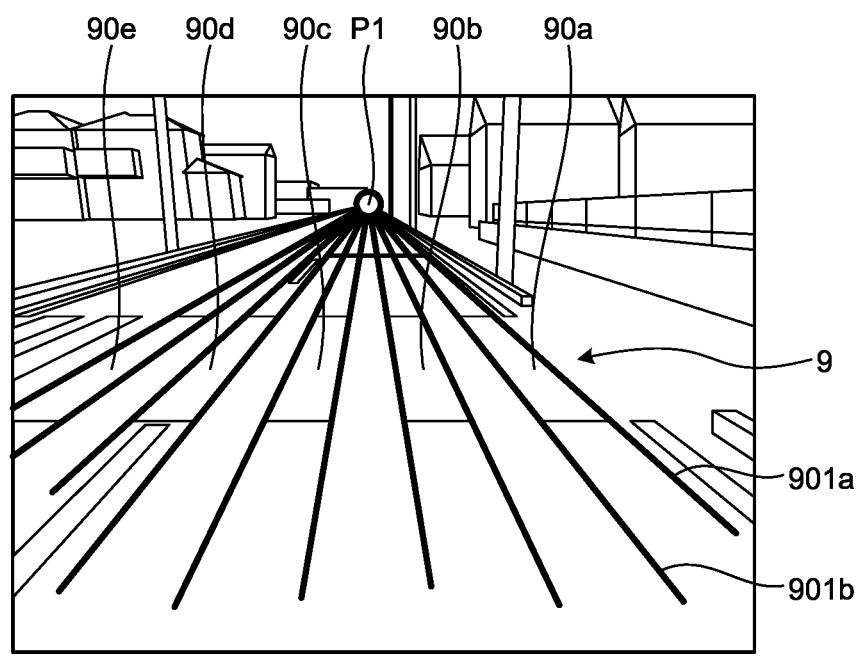
FIG. 11 is a diagram illustrating an example of crosswalk detection processing according to an embodiment.

FIG. 11 is a diagram illustrating an example of detection processing of the crosswalk 9 according to the first embodiment. The crosswalk is a road marking that indicates an area for pedestrians to cross the road by repeatedly drawing and arranging white rectangles on the road surface in parallel and at equal intervals. This white rectangle can be called a thick white line because its long side is significantly longer than its short side. Thus, the crosswalk 9 is detectable as a pattern in which a plurality of parallel thick white lines 90a to 90e repeats, for example, from the image data captured by the image pickup device 16, that is, among the captured image. As illustrated in FIG. 11, the scene determination unit 702 extracts contour lines (edges) 901a and 901b in the front-rear direction of the white line 90a included in the crosswalk 9. These contour lines 901a and 901b are simply referred to as a contour line 901 unless they are particularly distinguished individually. While FIG. 11 illustrates the contour lines 901a and 901b of the white line 90a, the scene determination unit 702 also extracts the contour lines of the other white lines 90b to 90e. In a case where a plurality of parallel lines such as the white lines 90a to 90e of the crosswalk 9 is shown in the image, if the plurality of contour lines extends in the depth direction of the image, the plurality of lines intersects at the vanishing point. On the other hand, in a case where the plurality of lines shown in the captured image does not intersect at the vanishing point even if they extend, the plurality of lines is not parallel in the actual three-dimensional space.

In the example illustrated in FIG. 11, the plurality of contour lines 901 of the plurality of white lines 90a to 90e intersects at a vanishing point P1, so it can be determined that there are parallel white lines 90a to 90e drawn repeatedly on the road surface. In this case, the scene determination unit 702 determines that the plurality of white lines 90a to 90e is the crosswalk 9. Moreover, it does not necessarily need to set the detection condition of the crosswalk 9 that the plurality of contour lines 901 completely intersects at the vanishing point P1. The determination of whether it is the crosswalk can be set as the condition that the lines extending the contour lines of the plurality of white lines intersect at approximately one point. In addition, the distance to the crosswalk is shown as the vertical distance from the center of the captured image at the end of the near side (the white rectangular short side on the near side) of the white line group. The center of the captured image corresponds to the optical axis direction of the image pickup device 16, so that the vertical distance from the center of the captured image corresponds to the angle from the optical axis direction of the end of the crosswalk. The angle of the optical axis of the image pickup device 16 can be specified. If the location on the captured image can be specified, it is possible to specify the angle (depression angle) of the line connecting the image pickup device 16 and the end of the crosswalk. The information regarding the height from the road surface to the image pickup device 16 and the assumption that the road surface is a flat surface can be added to this depression angle information. In this case, it is possible to calculate the distance between the image pickup device 16 and the crosswalk by the calculation using a trigonometric function. If the white line group is determined to be a crosswalk and the distance to the crosswalk is less than or equal to a predetermined value, the approach to the crosswalk can be regarded as being detected. Moreover, such detection processing of the crosswalk 9 or detection processing of approaching the crosswalk can be executed by the image pickup device 16, the vehicle control device 50 acquiring the image data from the image pickup device 16, or the sensor control device 70.

The detection processing based on the image data captured by the image pickup device 16 is sometimes capable of specifying the location of the crosswalk 9 more accurately than the use of the information obtained from the navigation system such as GPS. However, if the crosswalk 9 is covered with snowfall or the like, it is sometimes difficult to detect the crosswalk 9 from the image data. Thus, it is desirable to perform the determination of using not only the image data but also the map information and the estimation obtained by the detection of the traffic light together.

Moreover, a technique in which the scene determination unit 702 detects a traffic light around the vehicle 1 can be decided, for example, by image processing such as pattern recognition for a traffic light drawn in the image data. Alternatively, the scene determination unit 702 can specify the location of the traffic light from the map information.

In the crosswalk approaching scene, there is a high possibility that pedestrians are present on the crosswalk 9 or in the area leading to the crosswalk 9. Thus, in the case where the scene determination unit 702 determines that the scene is the crosswalk approaching scene, the control unit 703 controls the sonars 21 and 22 in such a way to improve the detection precision of a pedestrian in the range including the crosswalk 9. In one example, in a case where the result obtained by the scene determination is the crosswalk approaching scene, the control unit 703 changes one of the detection sensitivity of reflected waves, the emission interval of ultrasonic waves, and the emission sequence of ultrasonic waves, by using, as a reference, a range corresponding to the crosswalk 9 or an area where the crosswalk 9 extends to the sidewalk.

The description is now given of a case where the control unit 703 sets a high-sensitivity area on the basis of the range of the crosswalk 9 on the traveling path of the vehicle 1.

Figure 12:
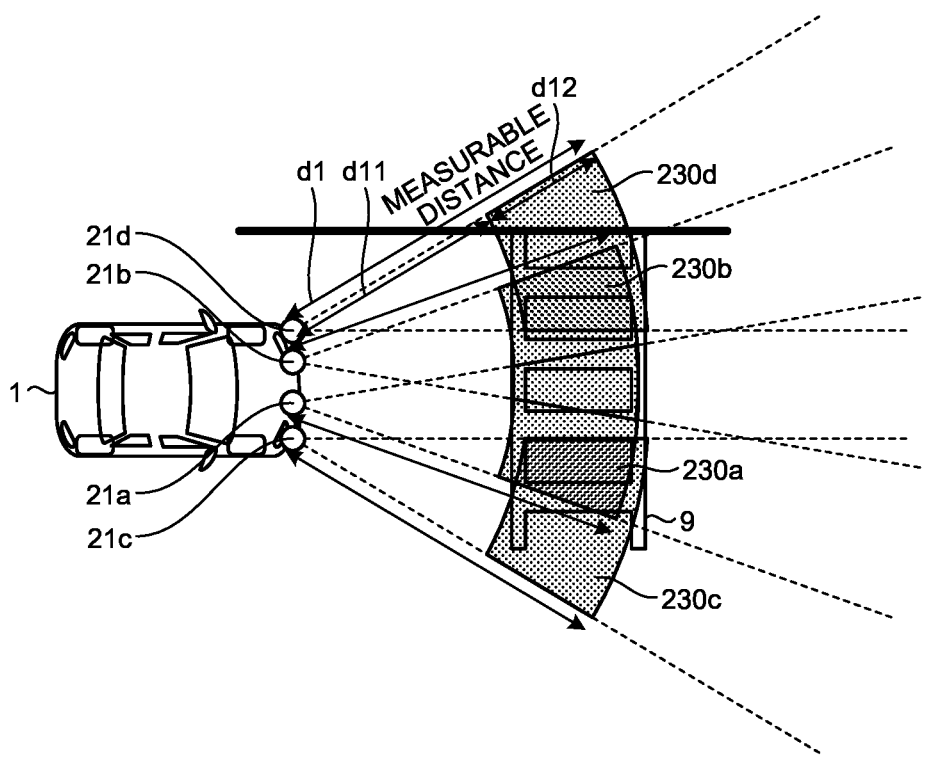
FIG. 12 is a diagram illustrating an example of a high-sensitivity area in the crosswalk approaching scene according to an embodiment.

FIG. 12 is a diagram illustrating an example of high-sensitivity areas 230a to 230d in the crosswalk approaching scene according to the present embodiment.

The control unit 703 sets the range of the high-sensitivity areas 230a to 230d on the basis of the range of the crosswalk 9 on the traveling path of the vehicle 1. The range zones of the high-sensitivity areas 230a to 230d are defined by the distance from the vehicle 1. The range zones of the high-sensitivity areas 230a to 230d can be individually set for the respective sonars 21 and 22 on the basis of the range in which the crosswalk 9 exists on the projection axis of the ultrasonic waves. Alternatively, the control unit 703 can collectively set a high-sensitivity area 230 of the sonars 21 and 22 on the basis of the range in which the crosswalk 9 exists in the traveling direction of the vehicle 1. The high-sensitivity areas 230a to 230d are collectively referred to as the high-sensitivity area 230 hereinafter.

Moreover, although the illustration of the detection range 210 is omitted in FIG. 12, the end of the detection range 210 far from the vehicle 1 is the same as the end of the high-sensitivity area 230 far from the vehicle 1. In other words, the portion of the detection range 210a far from the vehicle 1 is the high-sensitivity area 230a. In addition, in the detection range 210a, the range other than the high-sensitivity area 230a, that is, the portion close to the vehicle 1, is the normal-sensitivity area.

Moreover, in the range using the measurable distance d1 as a reference, which is set as the upper limit of the distance measurable by the sonars 21 and 22, the control unit 703 determines a range where the sensitivity for detecting the reflected waves is made high, i.e., the high-sensitivity area 230. The control unit 703 determines the high-sensitivity area 230 such that a distance, which specifies the high-sensitivity area 230, between the sonar and the far end of the high-sensitivity area 230 becomes the measurable distance d1.

More specifically, the high-sensitivity area 230 can be defined by a high-sensitivity area near-end distance d11 and a high-sensitivity area width d12. The high-sensitivity area near-end distance d11 is the distance between the sonar and the end of the high-sensitivity area 230 closer to the vehicle 1, and the high-sensitivity area width d12 is the distance between the end of the high-sensitivity area 230 closer to the vehicle 1 and the end far from the vehicle 1. In addition, the high-sensitivity area 230 can be defined as an area sandwiched between a high-sensitivity area far-end distance d1 and the high-sensitivity area near-end distance d11. The high-sensitivity area far-end distance is the distance between the sonar and the far end of the vehicle 1 in the high-sensitivity area 230. Alternatively, the high-sensitivity area 230 can be defined by the high-sensitivity area far-end distance d1 and the high-sensitivity area width d12. In this example, the measurable distance coincides with the high-sensitivity area far-end distance, so that the sum of the high-sensitivity area near-end distance d11 and the high-sensitivity area width d12 is equal to the measurable distance d1, as illustrated in FIG. 12.

Moreover, in the case of determining the high-sensitivity area far-end distance and the measurable distance d1, the measurable distance d1 can be determined using the high-sensitivity area far-end distance as a reference, or the high-sensitivity area far-end distance can be determined using the measurable distance d1 as a reference. In one example, if the distance between the vehicle 1 and the far end of the crosswalk 9 is 15 meters and the standard measurable distance of the sonar is 10 meters, the measurable distance d1 is determined to be 10 meters for the purpose of covering the range of the crosswalk 9 as wide as possible, which leads to determining the high-sensitivity area far-end distance to be 10 meters according to the measurable distance d1. In another example, if the distance between the vehicle 1 and the far end of the crosswalk 9 is 7 meters, the high-sensitivity area far-end distance is determined to be 7 meters, and the measurable distance d1 can be determined to be 7 meters, which is adjusted to be the same as the high-sensitivity area far-end distance, in such a way that the detection interval is as short as possible.

In the example illustrated in FIG. 12, the range zones of the high-sensitivity areas 230a to 230d of the respective sonars 21a to 21d are different. In one example, in FIG. 12, the measurable distance of the corner sonars 21c and 21d is set longer than the measurable distance of the central sonars 21a and 21b. In addition, the high-sensitivity areas 230c and 230d of the respective corner sonars 21c and 21d are set at a position farther from the vehicle 1 than the high-sensitivity areas 230a and 230b of the respective central sonars 21a and 21b. In this case, the combined shape of all the high-sensitivity areas 230a to 230d is roughly a gentle curve, so this approximate shape follows the form of the crosswalk 9. The high-sensitivity area is set by changing the detection threshold value, so in the example illustrated in FIG. 12, the detection threshold value differs for each of the sonars 21a to 21d.

In the previous example, the high-sensitivity area far-end distance is set to match the measurable distance d1, but it does not necessarily need to match, and the high-sensitivity area far-end distance can be set shorter than the measurable distance d1. In one example, the high-sensitivity area far-end distance, which is the far end of the high-sensitivity areas 230c and 230d of the corner sonars 21c and 21d, is larger than the high-sensitivity area far-end distance of the high-sensitivity areas 230a and 230b of the respective central sonars 21a and 21b. Thus, matching the measurable distance d1 with the high-sensitivity area far-end distance makes the time from the first emission to the subsequent emission by the corner sonars 21c and 21d larger than the time from the first emission to the subsequent emission by the central sonars 21a and 21b, leading to non-uniformity of the emission interval. In the case of giving priority to making the emission intervals equal, the emission interval, that is, the measurable distance d1, can be adjusted to match the corner sonars 21c and 21d having the larger value. The high-sensitivity area far-end distance of the central sonars 21a and 21b can be set shorter than the measurable distance d1 according to the range of the crosswalk. An area with normal sensitivity can be provided between the high-sensitivity area far-end distance and the measurable distance d1.

Figure 13:
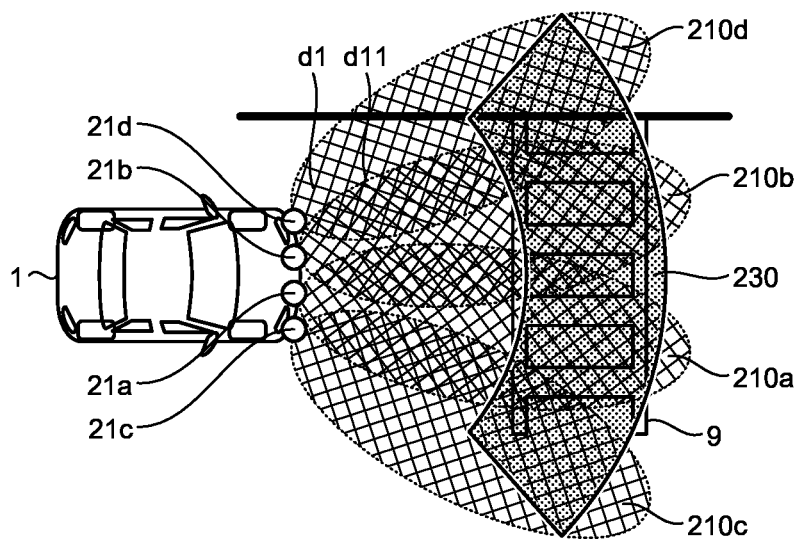
FIG. 13 is a diagram illustrating another example of the high-sensitivity area in the crosswalk approaching scene according to an embodiment.

In addition, FIG. 13 is a diagram illustrating another example of the high-sensitivity area 230 in the crosswalk approaching scene according to the present embodiment. In the example illustrated in FIG. 13, a detection threshold value that is common for the sonars 21a to 21d is set. In other words, the distance measurements from the far-end and near-end sonars of the high-sensitivity areas 230a to 230d of the respective sonars 21a to 21d are the same for all the sonars 21a to 21d. In this case, the high-sensitivity areas 230a to 230d are integrated, resulting in the high-sensitivity area 230 with a substantially fan shape.

The setting of different detection threshold values for the sonars 21a to 21d as illustrated in FIG. 12 makes it possible to cover the entire crosswalk 9 with the high-sensitivity area 230 efficiently. In addition, the setting of common detection threshold value for the sonars 21a to 21d as illustrated in FIG. 13 makes it easy to set the detection threshold value used for defining the high-sensitivity area 230. The present embodiments can employ either the example of FIG. 12 or FIG. 13.

Further, if the vehicle 1 is approaching the crosswalk 9, the range occupied by the crosswalk 9 on the projection axis of the ultrasonic waves also moves to a short distance, so that the control unit 703 changes the range of the high-sensitivity area 230 in accordance with the approach to the crosswalk 9.

Figure 14:
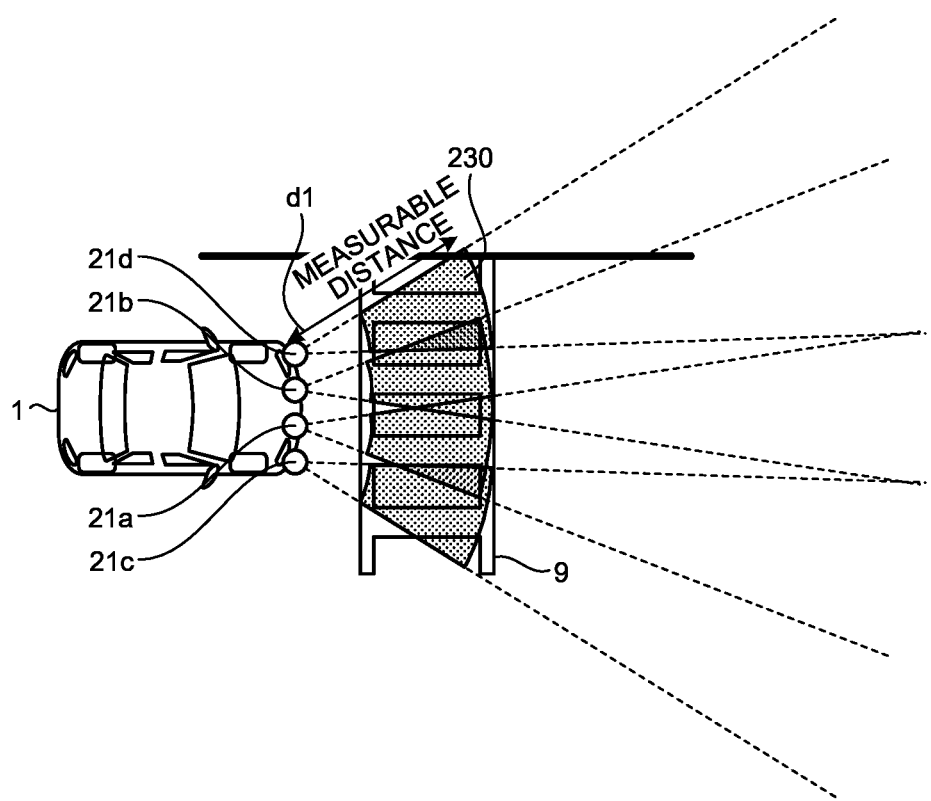
FIG. 14 is a diagram illustrating an example of a state in which a vehicle is closer to a crosswalk than that in FIG. 12.

For example, FIG. 14 is a diagram illustrating an example of a state in which the vehicle 1 is closer to the crosswalk 9 than that in FIG. 12. In this case, the control unit 703 causes the measurable distance d1 to be shorter by the distance indicating how approaching the vehicle 1 is to the crosswalk 9, compared with the example illustrated in FIG. 12. In addition, accordingly, the distance measurements from the vehicle 1 to the near end and the far end of the high-sensitivity area 230 are also shorter than the example illustrated in FIG. 12. Thus, even if the relative locations of the vehicle 1 and the crosswalk 9 vary, the high-sensitivity area 230 can be kept to cover the crosswalk 9.

In FIG. 14, the control unit 703 does not detect an object at a distance exceeding the high-sensitivity area 230 and causes the measurable distance d1 to be short in accordance with the approach to the crosswalk 9. As described above, the measurable distance d1 is a distance at which the echo fails to be detected due to the subsequent emission. In addition, shortening the time until the sonars 21 and 22 cease receiving the echo and emit the subsequent sound waves increases the number of detection tasks per hour. Thus, the shortened measurable distance d1 increases the frequency of the detection processing to be executed. The shapes of pedestrians are different and vary with time, so that the intensity of the ultrasonic waves reflected from the pedestrian also varies over time. Thus, the increased number of detection tasks by the sonars 21 and 22 per hour makes it possible to increase the probability of detecting a pedestrian.

Figure 15:
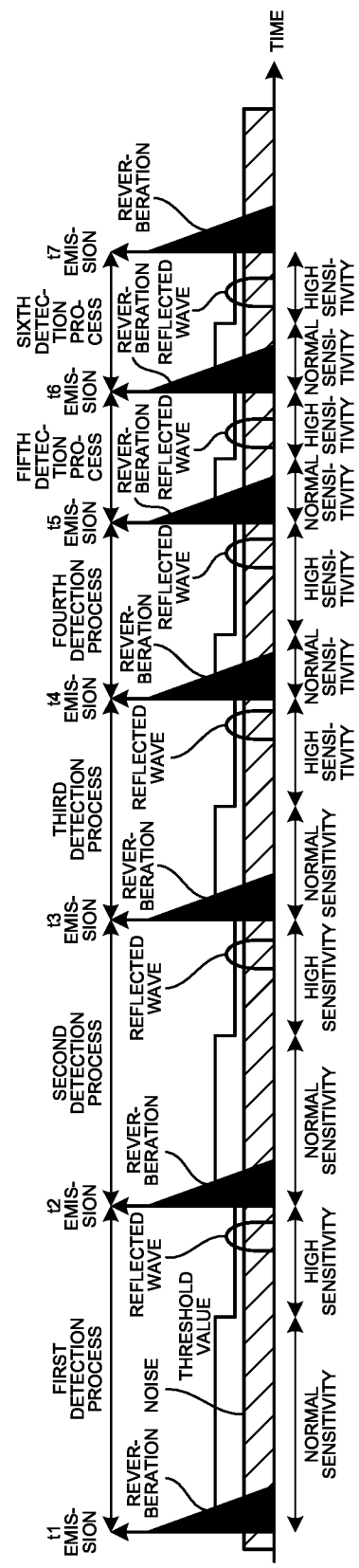
FIG. 15 is a diagram illustrating an example of a change in an emission interval of ultrasonic waves in the crosswalk approaching scene according to an embodiment.

FIG. 15 is a diagram illustrating an example of a change in an emission interval of ultrasonic waves in the crosswalk approaching scene according to the present embodiment. In the example illustrated in FIG. 15, the vehicle 1 is approaching the crosswalk 9, and the ultrasonic wave emission interval is shortened with this approach.

In other words, FIG. 15 schematically illustrates a variation in the high-sensitivity area 230 and a variation in the detection interval when the vehicle 1 approaches the crosswalk 9. The reflected waves illustrated in FIG. 15 are assumed to be reflected by a pedestrian on the crosswalk 9. Although the pedestrian has not moved from the same position on the crosswalk 9, the time from the emission to the return of the echo (reflected waves) gradually decreases from the first detection process to the fifth detection process because of the approach of the vehicle 1. In FIG. 15, the range in which the detection threshold value is further lowered is the high-sensitivity area 230.

In the case where the end position of the high-sensitivity area 230 is aligned with the measurable distance d1, the end position of the high-sensitivity area 230 is the farthest position measurable in the one-cycle detection processing, as illustrated in FIG. 15. In such a case, an object is not detected at a distance exceeding the high-sensitivity area 230. In the example illustrated in FIG. 15, the measurable distance d1 is shortened to narrow the emission interval, so that the range included in the measurable distance d1 necessarily ends in the high-sensitivity area.

Further, in FIG. 15, it is assumed that the vehicle 1 has stopped at the time of the fifth detection process. Thus, the distance between the vehicle 1 and the pedestrian who is an obstacle is set to be the same for the fifth detection process and the subsequent sixth detection process. In addition, the emission interval at the time of the fifth detection process is shorter than the emission interval at the time of the first detection process, so that the number of emission events per unit time, that is, the number of detection tasks increases, improving the certainty of pedestrian detection.

Further, a lower limit can be set for the distance between the vehicle 1 and the start position of the high-sensitivity area 230. This is because the intensity of the reflected waves is high in a place close to the vehicle 1, so detection omission of a pedestrian or the like is less likely to occur even if the high-sensitivity area 230 is not set. Specifically, the setting of the high-sensitivity area 230 by the control unit 703 is to make it easy to detect a weak echo reflected from a pedestrian. The sound waves emitted by the sonars 21 and 22 are diffused and weakened as the flight distance increases, so that the echo reflected and returned to the sonar gets weaker as it gets further away and gets stronger as it gets closer. Thus, in the case where the pedestrian is sufficiently close to the vehicle 1, the detection can be performed even if the detection threshold value is not lowered. In other words, the short-distance range does not necessarily need to be the high-sensitivity area 230.

Figure 16:
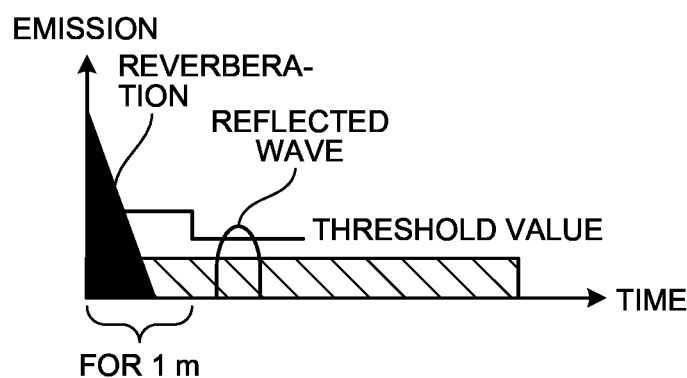
FIG. 16 is a diagram illustrating an example of a lower limit value of a distance to a start position of a high-sensitivity area according to an embodiment.

FIG. 16 is a diagram illustrating an example of a lower limit value of a distance to a start position of the high-sensitivity area 230 according to the present embodiment. The horizontal axis of an echo waveform is the time after the emission from the sonar, but as described above, the time after the emission from the sonars 21 and 22 is converted into the distance, so it can be said that the horizontal axis can correspond to the distance. As illustrated in FIG. 16, the lower limit value of the distance between the vehicle 1 and the start position of the high-sensitivity area 230 can be, for example, 1 meter. The time the threshold value is lowered can be set to equal the time when the reflected waves reflected at the distance of 1 meter are received. Moreover, the lower limit value is not limited to the above example.

Further, the description is now given of a technique of improving the detection precision of a pedestrian other than changing the sensitivity by changing the detection threshold value in the crosswalk approaching scene. In one example, the control unit 703 can change one or both of the emission interval at which the sonars 21 and 22 emit ultrasonic waves and the emission sequence in which the sonars 21 and 22 emit ultrasonic waves. Moreover, as described above, changing the emission sequence includes disabling the emission from one or more of the sonars 21 and 22. In addition, deactivating part of the sonars 21 and 22 eliminates the need to wait for the order of emission from the deactivated sonar, which makes it possible to increase the number of emission events per unit time from the activating sonar.

Figure 17:
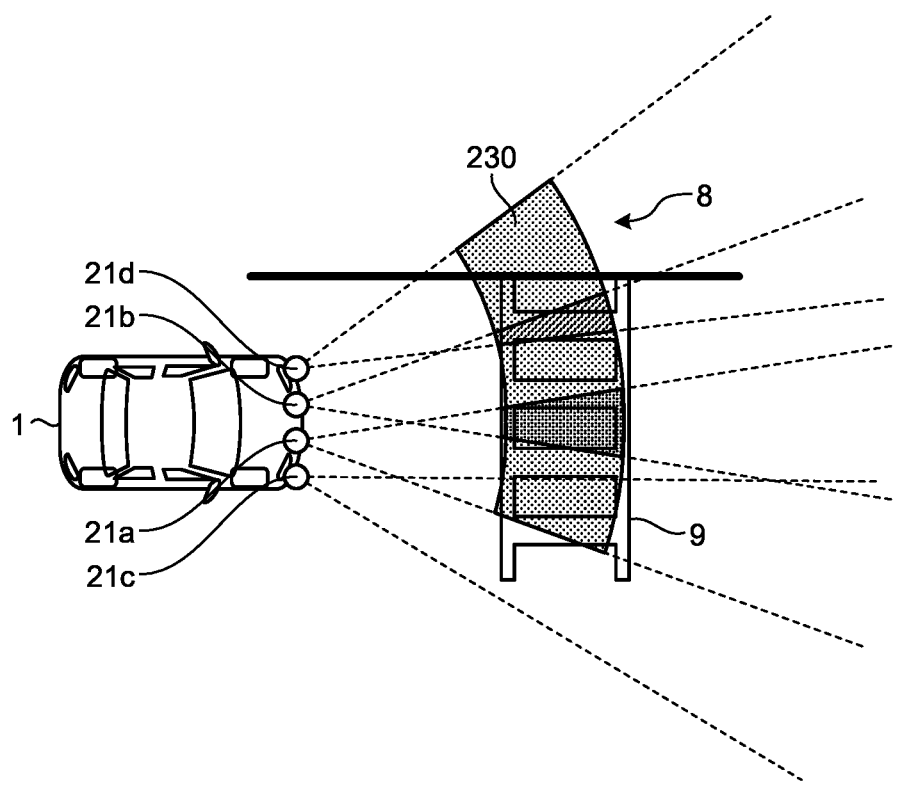
FIG. 17 is a diagram illustrating an example of deactivating part of sonars in the crosswalk approaching scene according to an embodiment.

FIG. 17 is a diagram illustrating an example of deactivating part of the sonars 21 in the crosswalk approaching scene according to the present embodiment. In the example illustrated in FIG. 17, the control unit 703 deactivates the first front corner sonar 21c located on the side farthest away from the sidewalk 8 among the front sonars 21a to 21d to prevent it from emitting ultrasonic waves.

Moreover, in the example illustrated in FIG. 17, the second front corner sonar 21d is an example of a sidewalk-side distance measuring device provided at the end of the vehicle 1 in the traveling direction to direct the side close to the sidewalk 8. In addition, the first front corner sonar 21*c* is an example of a roadway-side distance measuring device provided at the end of the vehicle 1 in the traveling direction to direct the side closer to the center of the roadway on which the vehicle 1 travels than the sidewalk-side distance measuring device.

Moreover, whether which of the left side or the right side of the vehicle 1 is closer to the sidewalk 8 can be determined, for example, on the basis of the Road Traffic Act of the country or district where the vehicle 1 travels, and which side of the vehicle 1 is closer to the sidewalk 8 can be stored in a storage unit such as the sensor control device 70. Alternatively, the control unit 703 can recognize the sidewalk 8 by the image processing from the image data acquired by the image pickup device 16 and specify the side closer to the recognized sidewalk 8. Alternatively, the control unit 703 can determine which of the left side or the right side of the vehicle 1 is closer to the sidewalk 8 on the basis of the map information and the location information of the vehicle 1. In other words, the direction of the sidewalk can be specified by the information regarding the geographical area where the vehicle is located or the information obtained by the image processing. In this case, the corner sonar in the direction of the sidewalk is kept active, and the corner sonar in the other direction is deactivated.

In this way, deactivating the emission from the first front corner sonar 21*c* near the center makes it possible to shorten the detection interval of other sonars.

The detection ranges 210*c* and 210*d* of the respective corner sonars 21*c* and 21*d* are typically set to achieve the detection of obstacles advancing into the traveling path of the vehicle 1 from outside the traveling path of the vehicle 1 in a short time. In one example, in an event where a pedestrian crosses the road in front of the vehicle 1 from the left or right side of the vehicle 1, the sonar that first detects the pedestrian among the front sonars 21 is the first front corner sonar 21*c* or the second front corner sonar 21*d*.

Further, the probability that a pedestrian is on the side of the sidewalk 8 is typically higher than the probability that the pedestrian is on the side closer to the center of the road than the vehicle 1. In addition, the probability that the pedestrian on the side of the sidewalk 8 will enter the traveling path of the vehicle 1 is higher than the probability that the pedestrian who is closer to the center than the vehicle 1 will enter the traveling path of the vehicle 1. Thus, it is reasonable to shorten the detection interval by reducing the frequency of emission of the first front corner sonar 21*c* near the center of the road or stopping the emission.

In the case where the first front corner sonar 21*c* located relatively far from the sidewalk 8 is deactivated and the pedestrian is detected by the three front sonars 21, it is possible to improve the frequency of detection by 33% compared with the case where the four front sonars 21 detect the pedestrian. In addition, if the frequency of emission of the first front corner sonar 21*c* located relatively far from the sidewalk 8 is halved, it is possible to improve the frequency of detection by 17% compared with the case where the emission is evenly performed by four sonars.

In the case where the scene determination result is the crosswalk approaching scene, by changing the emission sequence of the ultrasonic waves of the sonars 21 and 22, the control unit 703 may cause a frequency of emission of the ultrasonic waves by the sidewalk-side distance measuring device to be higher than a frequency of emission of the ultrasonic waves by the roadway-side distance measuring device. The change in the frequency in this case includes stopping the emission of ultrasonic waves by the roadway-side distance measuring device.

Specifically, in the case where the scene determination result is the normal scene, the control unit 703 causes the four front sonars 21, which are the first front corner sonar 21*c*, the first front central sonar 21*a*, the second front central sonar 21*b*, and the second front corner sonar 21*d*, to emit ultrasonic waves in this order. In the case where the scene determination result is the crosswalk approaching scene, the control unit 703 deactivates the first front corner sonar 21*c*, which is farther from the sidewalk 8, of the first front corner sonar 21*c* and the second front corner sonar 21*d*, to prevent it from emitting ultrasonic waves. The control unit 703 causes the first front central sonar 21*a* and the second front central sonar 21*b* to continue to emit ultrasonic waves. The control unit 703 can cause the first front central sonar 21*a*, the second front central sonar 21*b*, and the second front corner sonar 21*d*, which is not in a deactivated state, to emit ultrasonic waves in this order, making the frequency of emission of these three sonars to be four-thirds times that of the normal scene.

Moreover, in the case where the scene determination result is the crosswalk approaching scene, the control unit 703 can set a range in which the sensitivity for detecting the reflected waves is changeable, that is, the high-sensitivity area 230, in such a way that the high-sensitivity area 230 of the sidewalk-side distance measuring device is farther from the vehicle 1 than the high-sensitivity area 230 of the roadway-side distance measuring device. This control is to expand the high-sensitivity area 230 toward the sidewalk side.

Figure 18:
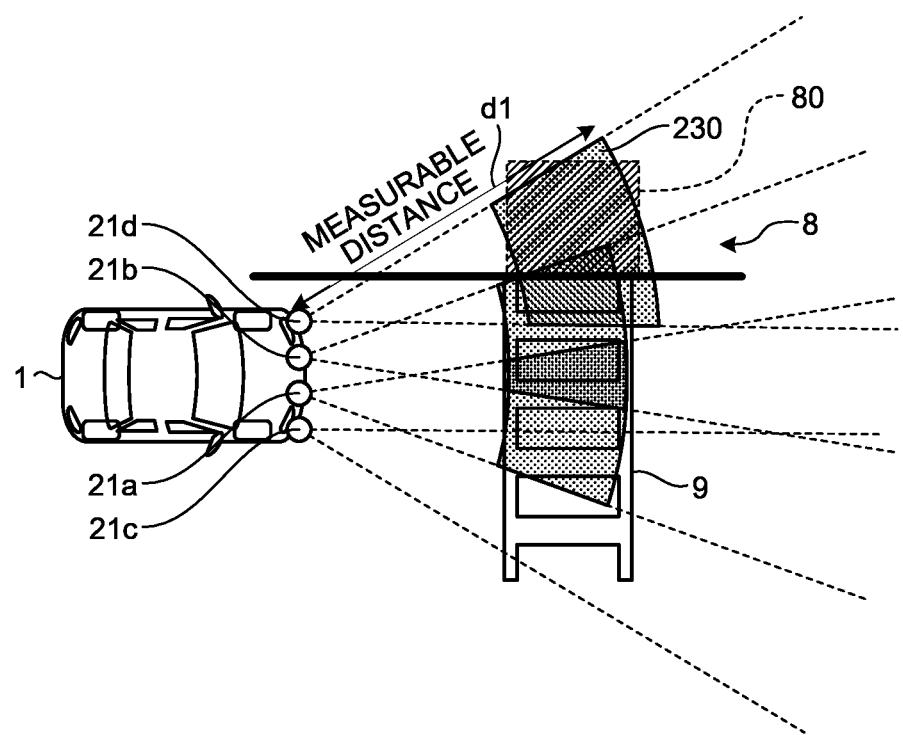
FIG. 18 is a diagram illustrating an example of expanding a detection range on the extension line of the crosswalk on a sidewalk in the crosswalk approaching scene according to an embodiment.

For example, FIG. 18 is a diagram illustrating an example of expanding the detection range 210 on the extension line of the crosswalk 9 on the sidewalk 8 in the crosswalk approaching scene according to the present embodiment.

In the example illustrated in FIG. 18, the high-sensitivity area 230 is expanded to, for example, an extension area 80, compared with the example illustrated in FIG. 17. The extension area 80 is an area in which the crosswalk 9 is extended to the sidewalk 8 in the roadside direction. A pedestrian entering the crosswalk 9 is likely to be walking in the traveling direction of the vehicle 1 through the extension area 80. In other words, a pedestrian trying to enter the crosswalk 9 in the extension area 80 is more likely to be present. The extension area 80, after the crosswalk 9, is an area where pedestrian detection is necessary.

The control unit 703 makes the measurable distance d1 of the second front corner sonar 21*d* on the sidewalk 8 longer than the measurable distance of the front central sonar or the measurable distance of the first front corner sonar 21*c* on the side farthest away from the sidewalk 8 (not illustrated). This is to include the extension area 80 in the high-sensitivity area 230, thereby extending the detection range 210 and the high-sensitivity area 230 in the direction of the sidewalk 8.

Further, in the case where a pedestrian is detected in the extension area 80 and it is determined that the pedestrian is moving in the direction toward the crosswalk 9 by the tracking processing, the vehicle control device 50 determines that the pedestrian is trying to cross the crosswalk 9. In this case, the vehicle control device 50 can execute control such as stopping the vehicle 1 by instructing the speed control device 40 to control the braking of the vehicle 1. However, the case where a pedestrian detected in the extension area 80 enters the traveling path of the vehicle 1 and is likely to collide with the vehicle 1 is limited to the case where the vehicle 1 is traveling at a low speed or is stopped. The extending of the detection distance to the extension area 80 leads to the disadvantage that the detection interval increases. Thus, if the vehicle speed is a given level or more, the detection distance can be restricted not to be extended to the extension area 80.

In this regard, as described above, the size of the range that can be set as the high-sensitivity area 230 in the detection range 210 is limited due to the restriction of the processing load and the like. Thus, the width of the crosswalk 9 is sometimes larger than the width of the high-sensitivity area 230 that can be set within the limit. In such a case, the high-sensitivity area 230 fails to cover the entire crosswalk 9. Moreover, the width of the high-sensitivity area 230 is the distance from the start position to the end position of the high-sensitivity area 230.

Figure 19:
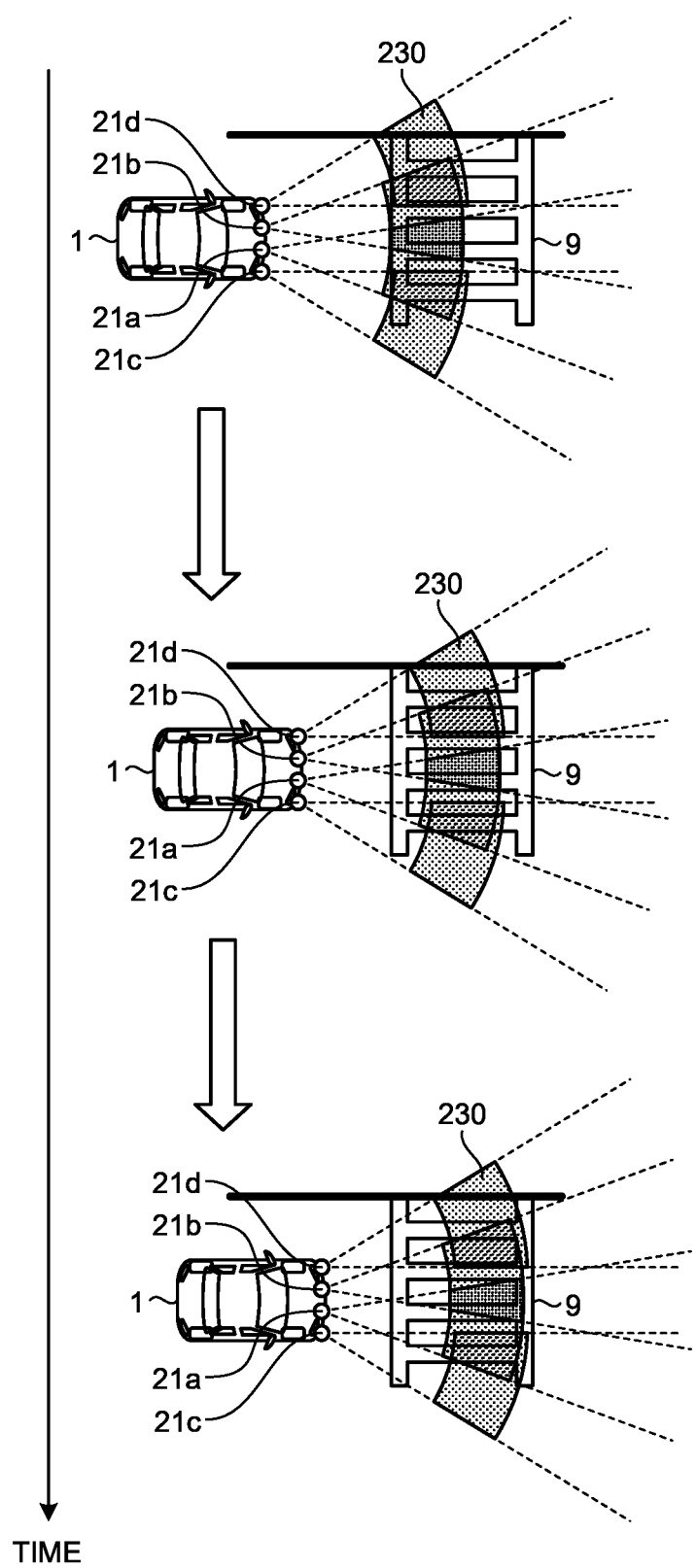
FIG. 19 is a diagram illustrating an example of a case where the width of the crosswalk is larger than the width of the high-sensitivity area in the crosswalk approaching scene according to an embodiment.

FIG. 19 is a diagram illustrating an example of a case where the width of the crosswalk 9 is larger than the width of the high-sensitivity area 230 in the crosswalk approaching scene according to the present embodiment.

As illustrated in the upper portion of FIG. 19, in the case where the high-sensitivity area 230 fails to cover the entire crosswalk 9, the control unit 703 first sets the high-sensitivity area 230 such that the high-sensitivity area 230 covers the range closer to the vehicle 1 (range on the near side of the vehicle 1) of the crosswalk 9.

In the case where the vehicle 1 passes through the crosswalk 9 at a vehicle speed equal to or higher than a predetermined speed, the control unit 703 can maintain the positional relationship between the set high-sensitivity area 230 and the vehicle 1, and the setting of the high-sensitivity area 230 can remain until the high-sensitivity area 230 passes through the crosswalk 9. In the middle and lower portions of FIG. 19, the vehicle is moving forward while maintaining the same high-sensitivity area 230, similar to the upper portion of FIG. 19.

In the case where the vehicle 1 passes through the crosswalk 9 at the vehicle speed equal to or higher than the predetermined speed, the pedestrian is less likely to enter a place targeted for the detection processing as the high-sensitivity area 230 after the detection processing. In one example, in the lower portion of FIG. 19, part of the crosswalk 9 is included between the high-sensitivity area 230 and the vehicle 1, but this part of the crosswalk 9 is subject to the detection processing as the high-sensitivity area 230 in the upper and middle portions. Thus, it is unlikely that there is a pedestrian. Moreover, the predetermined speed is, for example, higher than the walking speed of normal pedestrians.

However, in the case where the vehicle 1 does not pass through the crosswalk 9 while not maintaining the vehicle speed equal to or higher than the predetermined speed, for example, if the vehicle 1 stops at the position illustrated in the lower portion of FIG. 19, the pedestrian is likely to enter part of the crosswalk 9 between the high-sensitivity area 230 and the vehicle 1. The measures for such a case are described with reference to FIG. 20.

Figure 20:
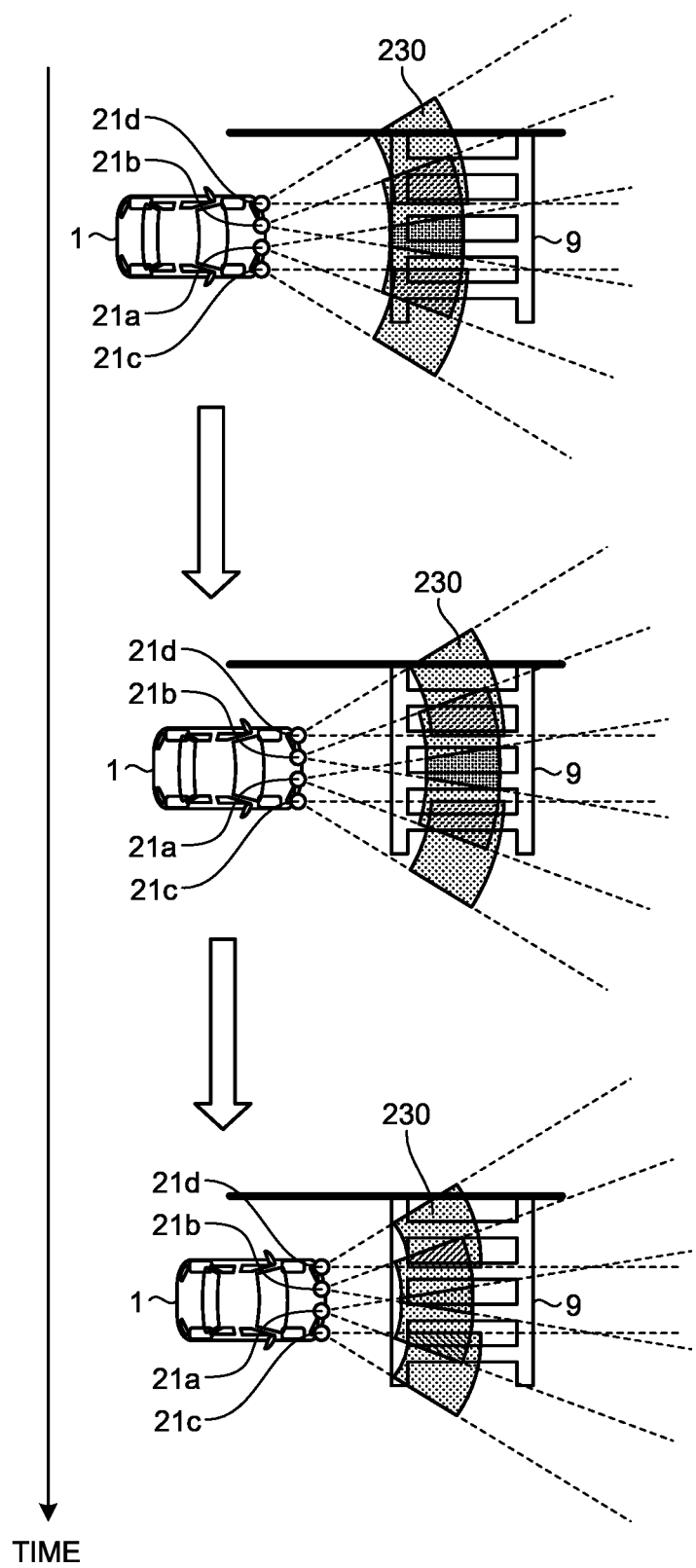
FIG. 20 is a diagram illustrating an example of a case where a vehicle stops on a near side of a crosswalk wider than the width of a high-sensitivity area in the crosswalk approaching scene according to an embodiment.

FIG. 20 is a diagram illustrating an example of a case where the vehicle 1 stops on a near side of the crosswalk 9 wider than the width of the high-sensitivity area 230 in the crosswalk approaching scene according to the present embodiment. The upper and middle portions of FIG. 20 are similar to those in FIG. 19, but it is assumed that the vehicle 1 is stopped at the position illustrated in the middle portion. In this case, in the arrangement of the high-sensitivity area 230 illustrated in the middle portion, a pedestrian is likely to enter between the vehicle 1 and the high-sensitivity area 230. Thus, in the lower portion of FIG. 20, unlike FIG. 19, the position of the high-sensitivity area 230 is moved closer to the vehicle 1 such that the high-sensitivity area 230 covers the range closer to the vehicle 1 (range on the near side of the vehicle 1) of the crosswalk 9. In the case where the scene is the crosswalk approaching scene and the vehicle 1 is stopped on the near side of the crosswalk 9 that is wider than the width of the high-sensitivity area 230, the control unit 703 changes the detection threshold value such that the high-sensitivity area 230 covers the range close to the vehicle 1.

The preceding-vehicle approaching scene will be described. In the case of detecting, for example, a preceding vehicle within a distance detectable by the sonars 21 and 22, the scene determination unit 702 determines that the scene is the preceding-vehicle approaching scene. Moreover, the preceding vehicle is a vehicle located in the traveling direction of the vehicle 1 and having the same traveling direction as the vehicle 1.

More specifically, the control unit 703 is intended to accurately detect a pedestrian who has entered between the preceding vehicle and the vehicle 1 or a pedestrian who enters between the preceding vehicle and the vehicle 1 in the preceding-vehicle approaching scene.

For example, there is a case where the traveling direction of the vehicle 1 is forward, the preceding vehicle is stopped, and the vehicle 1 stops behind the preceding vehicle while keeping the inter-vehicle distance less than or equal to a distance detectable by the front sonar 21 (e.g., 5 meters). In this case, the scene determination unit 702 determines that the scene is the preceding-vehicle approaching scene. Moreover, the distance between the preceding vehicle and the vehicle 1 can be measured by the front sonar 21 or the radar 17.

Moreover, the conditions of the preceding-vehicle approaching scene do not necessarily need to include stopping the vehicle 1 and the preceding vehicle. In one example, even in the case the vehicle 1 and the preceding vehicle are traveling at a low speed (e.g., a speed of less than 2 km/h) while maintaining the inter-vehicle distance detectable by the sonar 21, a pedestrian is likely to enter between the preceding vehicle and the vehicle 1. Thus, this case also can be included in the preceding-vehicle approaching scene.

In one example, in the case where the vehicle 1 is equipped with a preceding vehicle follow-up function, it is possible to detect the start of the preceding vehicle in front of the vehicle 1 and follows-up the preceding vehicle. The use of such a preceding vehicle follow-up function reduces the burden on the driver, but the driver's attention is likely to be reduced because the start is not delayed even if the driver is not looking ahead. There is the case where the driver is unaware of a pedestrian between the vehicle 1 and the preceding vehicle, is taking the foot off the brake, and the sonar 21 fails to detect the pedestrian. In this case, if the vehicle 1 starts to follow the preceding vehicle, there is a risk of collision with the pedestrian. Moreover, the preceding vehicle follow-up function does not need to be an indispensable configuration, and even when the vehicle 1 is not equipped with the preceding vehicle follow-up function, it is desirable to improve the precision of detecting a pedestrian who has entered between the vehicle 1 and the preceding vehicle.

In general, not all pedestrians behave in compliance with the Road Traffic Act and other traffic safety rules. In one example, in a case where both the lane in which the vehicle 1 is traveling and the oncoming lane are congested on the roadway and the vehicle traffic flow is stagnant, a pedestrian sometimes crosses through between the vehicle 1 and the preceding vehicle. In this event, the vehicle 1 desirably detects the pedestrian and controls to suppress the follow-up start.

Further, the scene determination unit 702 can exclude the vehicle speed from the preceding-vehicle approaching scene on condition that the vehicle speed is equal to or higher than a predetermined value (e.g., 2 km/h). This is because, if the vehicle traffic flow is fast, a pedestrian will not cross through between the vehicles. The vehicle traffic flow is an expression that compares the movement of a group of vehicles running on the lane to the flow. In one example, in the case where all the vehicles are stopped at a red light, the vehicle traffic flow is expressed as stagnant flow. If the vehicle is traveling crawlingly in a traffic jam, the vehicle traffic flow is expressed to be slow down, and if the vehicle is traveling at a speed equal to or higher than a predetermined value, the vehicle traffic flow is expressed as smooth flow.

In the case where the scene determination result is the preceding-vehicle approaching scene, the control unit 703 changes one of the detection sensitivity for receiving reflected waves, the emission interval of ultrasonic waves, and the emission sequence of ultrasonic waves, using the distance between the vehicle 1 and a preceding vehicle 3 as a reference. In one example, in the case of the preceding-vehicle approaching scene, it is not necessary to detect a pedestrian beyond the distance between the vehicle 1 and the preceding vehicle 3, so that the control unit 703 can change the detection sensitivity such that the distance between the vehicle 1 and the end position of the high-sensitivity area 230 is less than or equal to the distance between the vehicle 1 and the preceding vehicle 3.

Moreover, in the preceding-vehicle approaching scene, it is preferably determined whether or not the vehicle traffic flow on the adjacent lane (e.g., the oncoming lane) is stagnant. This determination processing can be executed by the control unit 703 of the sensor control device 70 or can be executed by the scene determination unit 702 of the sensor control device 70. Alternatively, the vehicle control device 50 can execute the determination processing. The description is now given by exemplifying that the control unit 703 performs the execution.

In one example, in the case where the vehicle 1 is stopped and the distance to an obstacle detected by the second front corner sonar 21*d* on the left side is fixed, it can be determined that the vehicle traffic flow on the left side is stagnant. In addition, in the case where the vehicle 1 is moving forward and the approaching speed of the obstacle corresponds to the vehicle speed of the vehicle 1, it can be determined that the detected obstacle (in this case, another vehicle) is stationary. If the speed of another vehicle in the adjacent lane is less than a predetermined value (e.g., 2 km/h), the control unit 703 can determine that the vehicle traffic flow is stagnant. In other words, in the case where the speed of another vehicle traveling in the adjacent lane is equal to or higher than the threshold value, the control unit 703 determines that the vehicle traffic flow is smooth. In addition, there is a time delay from when the vehicle traffic flow is stagnant until the pedestrian starts crossing, so that the control unit 703 determines that the lane in which another vehicle is traveling is stagnant when the speed of the other vehicle is less than a predetermined value for a predetermined time (e.g., 1 second).

Figure 21:
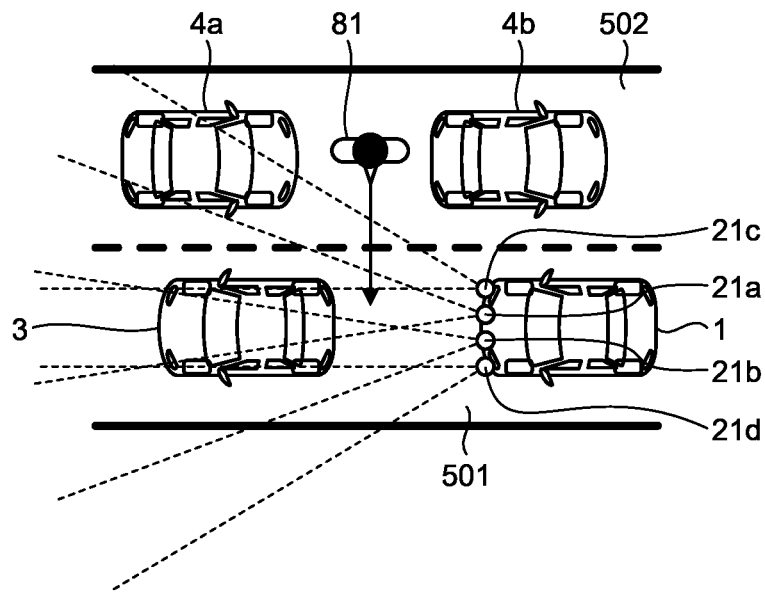
FIG. 21 is a diagram illustrating an example of a preceding-vehicle approaching scene according to an embodiment.

FIG. 21 is a diagram illustrating an example of a preceding-vehicle approaching scene according to the present embodiment. In the example illustrated in FIG. 21, the preceding vehicle 3 exists in front of the vehicle 1. In addition, there is a pedestrian 81 that enters between the vehicle 1 and the preceding vehicle 3 from between other vehicles 4*a* and 4*b* on an oncoming lane 502 adjacent to the lane in which the vehicle 1 travels. In addition, the lane in which the vehicle 1 travels is referred to as a driver's own lane 501. In addition, the oncoming lane 502 is an example of an adjacent lane. The adjacent lane is not limited to the oncoming lane 502, and can be a lane in the same traveling direction as the driver's own lane 501. In addition, while the driver's own lane 501 is adjacent to the sidewalk 8 in FIG. 21, it can be located between adjacent lanes. As illustrated in FIG. 21, in the case where the vehicle traffic flow in the adjacent lane is stagnant, it is necessary to detect a pedestrian on the assumption that the pedestrian even on the roadway can walk. In the case of FIG. 21, the right side of the vehicle 1 is the lane where the vehicle traffic flow is stagnant, and the left side of the vehicle 1 is the sidewalk, so it is necessary to be able to detect a pedestrian entering from both the left and right sides.

Moreover, it is necessary to detect the entry of the pedestrian 81 not only when the vehicle traffic flow of both the driver's own lane 501 and the adjacent lane 502 are stopped, but also when the vehicle traffic flow is stopped only in the driver's own lane 501.

Figure 22:
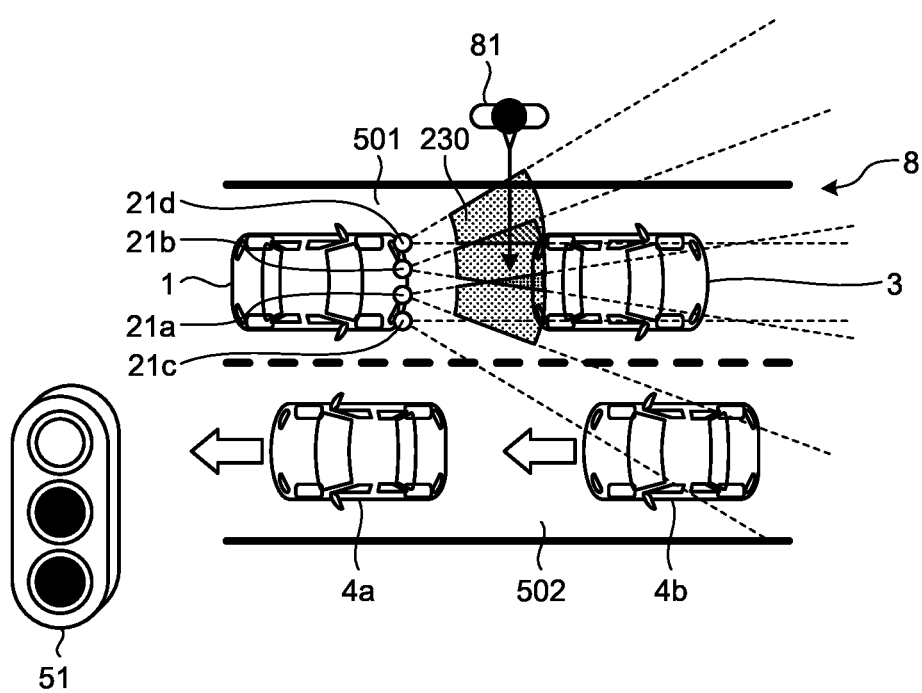
FIG. 22 is a diagram illustrating an example of a case where a traffic light is present in front of an oncoming lane in the preceding-vehicle approaching scene according to an embodiment.

FIG. 22 is a diagram illustrating an example of a case where a traffic light 51 is present in front of the oncoming lane 502 in the preceding-vehicle approaching scene according to the present embodiment. In one example, even in the case where the vehicle traffic flow in the oncoming lane 502 is smooth, if the traffic light 51 in front of the oncoming lane 502 changes to a red light, the vehicle traffic flow is more likely to be stagnant. Thus, the pedestrian 81 sometimes enters from the sidewalk 8 without waiting for vehicle traffic flow on both lanes to be stagnant.

However, in the present condition, the vehicle traffic flow in the oncoming lane 502 is smooth, and it is unlikely that the pedestrian 81 will enter from the side of the oncoming lane 502. Thus, only the pedestrian 81 entering from the sidewalk 8 can be a target to be detected. Thus, in the example illustrated in FIG. 22, the control unit 703 makes the emission from the first front corner sonar 21*c* on the side close to the oncoming lane 502 deactivate. In other words, the control unit 703 makes the frequency of emission from the corner sonar 21 on the side of the adjacent lane in which the vehicle traffic flow is smooth lower than the frequency of emission from the corner sonar 21 on the side of the sidewalk 8. The corner sonar 21 is one of the first front corner sonar 21*c* and the second front corner sonar 21*d*. Moreover, reducing the frequency of emission includes deactivating the emission.

If the time has passed from the state illustrated in FIG. 22 and the vehicle traffic flow in the oncoming lane is stopped, this situation is the state in which the driver's own lane 501 and the oncoming lane 502 have stopped as illustrated in FIG. 21. Then, in some cases, the pedestrian 81 enters the driver's own lane 501 from the oncoming lane 502, and the pedestrian 81 also enters the driver's own lane 501 from the sidewalk 8, so it is necessary to detect both lanes. In other words, it is necessary to constantly optimize the detection range by determining whether or not the vehicle traffic flow in the adjacent lane is stopped every moment and determining the direction in which the entry of the pedestrian 81 is detected on the basis of the determination result.

Moreover, while two lanes on both sides are illustrated in FIG. 22, the oncoming lane 502 can be replaced with an adjacent lane in the same traveling direction as the driver's own lane 501. If the vehicle traffic flow of the driver's own lane 501 is stopped and the vehicle traffic flow of the adjacent lane is stopped, it is necessary to pay attention to the entry of the pedestrian 81 from the side of the adjacent stopped lane. In addition, if the vehicle traffic flow in the adjacent lane is smooth, there is no possibility that the pedestrian 81 will enter from the adjacent lane, so it is not necessary to detect with high sensitivity. In other words, regardless of whether the direction of vehicle traffic flow in the adjacent lane is the same as or in the opposite direction to the driver's own lane, there is no pedestrian 81 crossing over the lane in which the vehicle traffic flow is smooth, and if the vehicle traffic flow is stagnant, in many cases, it can be said that the pedestrian 81 crosses through between the rows of vehicles regardless of the direction of the vehicle traffic flow when the vehicle traffic flow is smooth.

The description above is given of the way of observing the movement of the vehicle traffic flow in the adjacent lane to optimize the detection range. However, as a simple means, a way can be employed in which it is not determined whether or not other vehicles 4a and 4b on the adjacent lane 502 are stopped. In one example, the control unit 703 can cause the area for detecting the pedestrian 81 to be symmetrical at all times, which makes it possible for the pedestrian 81 to be detected even if the pedestrian 81 enters from either the left or right side.

The fact that the vehicle speed of the vehicle 1 is equal to or less than a predetermined value or the fact that the vehicle 1 is stopped can be included in the determination condition for the preceding-vehicle approaching scene. However, as a simplified scene determination method, the determination condition for the preceding-vehicle approaching scene can include only the fact that the vehicle 1 is following the preceding vehicle 3 rather than using the vehicle speed of the vehicle 1 as the determination condition.

The priority of determination of the crosswalk approaching scene and the preceding-vehicle approaching scene will be described.

Figure 23:
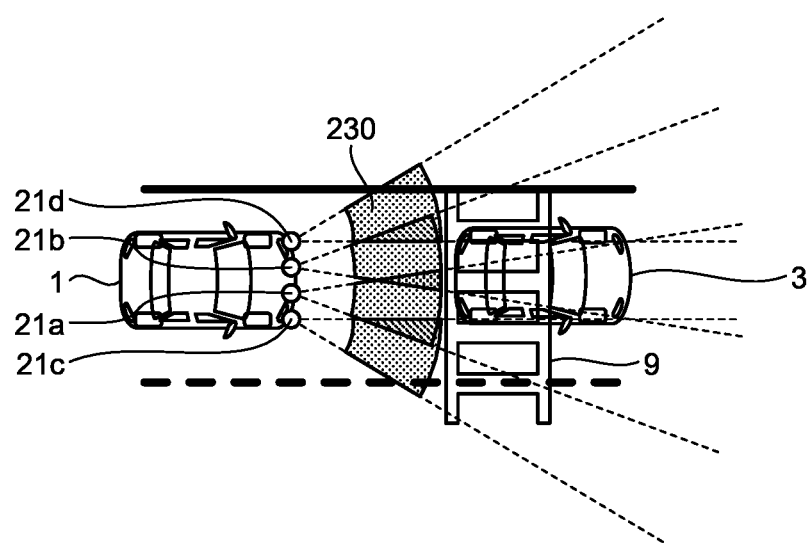
FIG. 23 is a diagram illustrating an example of a state in which the vehicle is approaching the crosswalk and is following a preceding vehicle according to an embodiment.

FIG. 23 is a diagram illustrating an example of a state in which the vehicle 1 is approaching the crosswalk 9 and is following the preceding vehicle 3 according to the present embodiment. In such a case, if the vehicle 1 is following the preceding vehicle 3, the scene determination unit 702 determines that the scene is the preceding-vehicle approaching scene even if the vehicle 1 is approaching the crosswalk 9. However, this may not be applicable in dependence on the positional relationship between the crosswalk 9 and the preceding vehicle 3.

Figure 24:
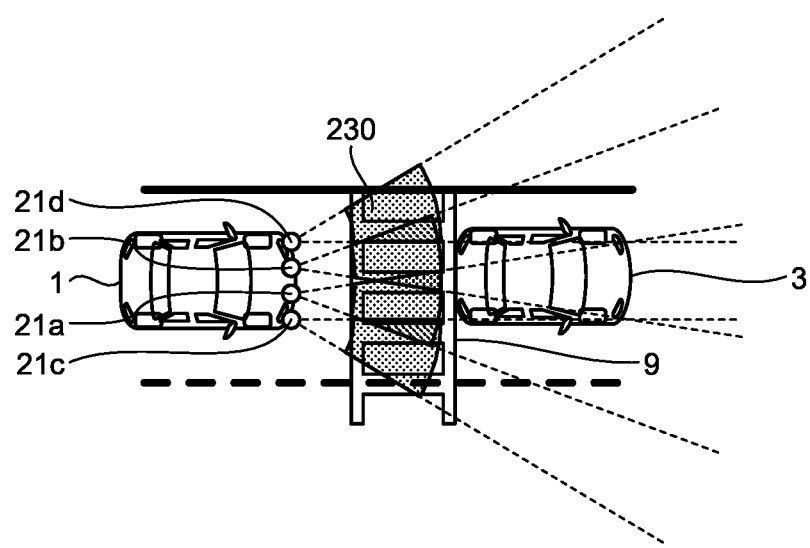
FIG. 24 is a diagram illustrating another example of a state in which the vehicle is approaching the crosswalk and is following the preceding vehicle according to an embodiment.

FIG. 24 is a diagram illustrating another example of a state in which the vehicle 1 is approaching the crosswalk 9 and is following the preceding vehicle 3 according to the present embodiment. As illustrated in FIG. 24, in the case where the crosswalk 9 is located between the vehicle 1 and the preceding vehicle 3 and the preceding vehicle 3 is not present on the crosswalk, the scene determination unit 702 determines that the scene is the crosswalk approaching scene.

In the case where the vehicle 1 is approaching the crosswalk 9 and the preceding vehicle 3 is stopped ahead, there is a possibility that the preceding vehicle 3 is on the crosswalk 9, that is, the preceding vehicle 3 is likely to hinder the pedestrian 81 from crossing the crosswalk 9, as illustrated in FIG. 23. The situation in which a vehicle is stopped on the crosswalk 9 and hinders the pedestrian 81 from crossing the crosswalk 9 is generally a violation of traffic rules. However, it often occurs in an area where traffic congestion occurs frequently. In addition, the fact that the crosswalk 9 is often blocked by a vehicle also causes the pedestrian 81 to cross a roadway other than the crosswalk 9.

In such a case, the scene determination unit 702 estimates that the pedestrian 81 crosses between the vehicle and the preceding vehicle 3 and not the crosswalk 9, resulting in the determination that the scene is the preceding-vehicle approaching scene.

In the case where the preceding vehicle 3 is not on the crosswalk 9 as illustrated in FIG. 24, the scene determination unit 702 determines that the scene is the crosswalk approaching scene. The control unit 703 sets a high-sensitivity area 203 such that the high-sensitivity area 203 covers the crosswalk 9 on the assumption that the pedestrian 81 crosses over the crosswalk 9. As illustrated in FIG. 23, in the case where the preceding vehicle 3 occupies and blocks the crosswalk, the scene is determined to be the preceding-vehicle approaching scene. If the control unit 703 sets the high-sensitivity area 203 between the vehicle 1 and the preceding vehicle 3, it can be expected to detect the pedestrian 81 crossing while avoiding the preceding vehicle 3 that is blocking the crosswalk 9.

The description is now given of the measurable distance d1 in the preceding-vehicle approaching scene.

Figure 25:
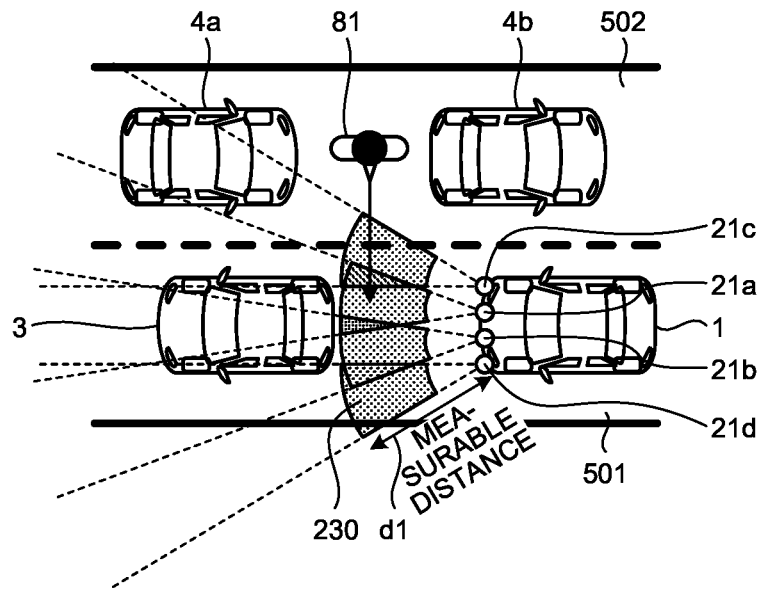
FIG. 25 is a diagram illustrating an example of a measurable distance in the preceding-vehicle approaching scene according to an embodiment.

FIG. 25 is a diagram illustrating an example of the measurable distance d1 in the preceding-vehicle approaching scene according to the present embodiment. The area that requires caution for the pedestrian 81 entering the traveling path of the vehicle 1 upon the traffic congestion is between the vehicle 1 and the preceding vehicle 3 in front of the vehicle 1. The preceding vehicle 3 itself in front does not necessarily need to be included in the detection target of the front sonar 21, so that the control unit 703 can limit the measurable distance d1 to the distance between the vehicle and the preceding vehicle 3 in front of the vehicle or a little shorter than that. Generally, in the case where the vehicle 1 is equipped with a follow-up traveling function, the radar 17 or the image pickup device 16 monitors the distance between the vehicle 1 and the preceding vehicle 3 in front of the vehicle 1. Thus, if there is the radar 17 or the like, it does not necessarily need to monitor the distance between the vehicle and the preceding vehicle 3 in front of the vehicle by the front sonar 21 having a shorter detectable distance. The measurable distance d1 limited to a shorter distance makes it possible to increase the frequency of detection by the front sonar 21. In addition, setting the area between the vehicle and the preceding vehicle 3 to the high-sensitivity area 203 makes it possible to make it easier to detect the pedestrian 81.

Figure 26:
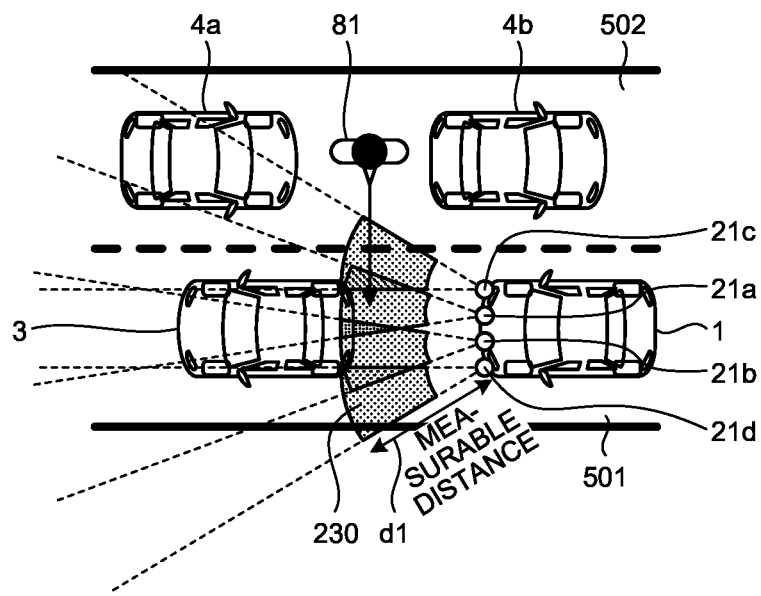
FIG. 26 is a diagram illustrating another example of the measurable distance in the preceding-vehicle approaching scene according to an embodiment.

In addition, FIG. 26 is a diagram illustrating another example of the measurable distance d1 in the preceding-vehicle approaching scene according to the present embodiment. In the example illustrated in FIG. 26, the measurable distance d1 includes the rear-end portion of the preceding vehicle 3. In one example, if there is an error in the inter-vehicle distance to the preceding vehicle 3 measured by the radar 17 or the image pickup device 16, the measurable distance d1 of the front sonar 21 is sometimes shorter than the inter-vehicle distance. In this case, there is a possibility of failing to detect the pedestrian 81 that has entered immediately after the preceding vehicle 3. The occurrence of such a situation can be reduced by setting the ultrasonic wave emission interval by the control unit 703 such that the rear-end portion of the preceding vehicle 3 is included in the measurable distance d1.

This makes it possible to detect the echo from the preceding vehicle 3, resulting in monitoring the distance between the vehicle and the preceding vehicle 3 in front of the vehicle by the front sonar 21. In this case, if the pedestrian 81 enters the side closer to the vehicle than the preceding vehicle 3, an echo from a position closer than the echo from the preceding vehicle 3 is detected.

In the case where an echo from a position closer than the echo of the preceding vehicle 3 is detected, for example, the vehicle control device 50 determines that an obstacle (a pedestrian) has entered between the vehicle and the preceding vehicle 3. The vehicle control device 50 instructs the speed control device 40 to hold the braking until the pedestrian 81 passes. In addition, in the case where an echo from a position closer than the echo of the preceding vehicle 3 is detected, the vehicle control device 50 or the speed control device 40 can control the vehicle 1 such that the vehicle 1 does not start even if the preceding vehicle 3 starts.

Further, in the case where the scene determination result is the preceding-vehicle approaching scene, the control unit 703 can change the emission sequence in which the front sonars 21 emit ultrasonic waves. In one example, the frequency of emitting ultrasonic waves by the first front corner sonar 21c and the second front corner sonar 21d can be made higher than the frequency of emitting ultrasonic waves by the first front central sonar 21a and the second front central sonar 21b.

In one example, in the preceding-vehicle approaching scene, the control unit 703 can deactivate the emission of ultrasonic waves by the first front central sonar 21a and the second front central sonar 21b, and can cause the first front corner sonar 21c and the second front corner sonar 21d to emit ultrasonic waves alternately.

Figure 27:
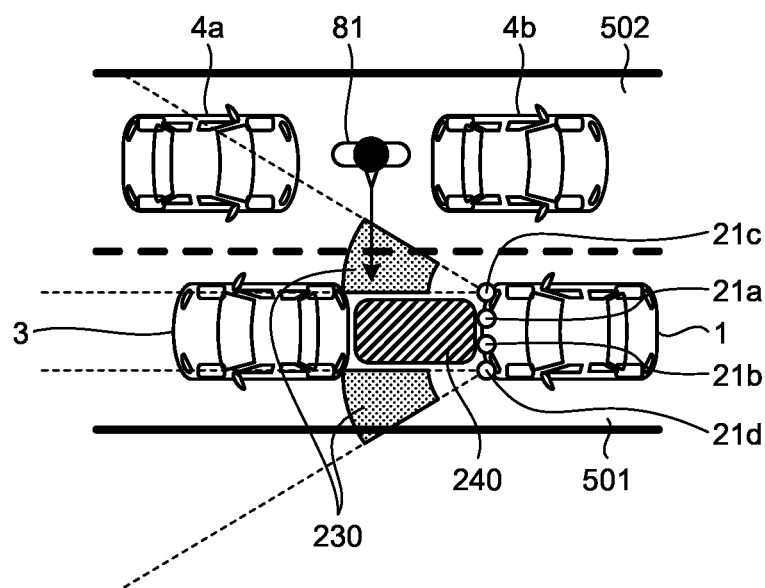
FIG. 27 is a diagram illustrating an example of a state in which the emission by a front central sonar is stopped in the preceding-vehicle approaching scene according to an embodiment.

FIG. 27 is a diagram illustrating an example of a state in which the emission by the front central sonars 21a and 21b is stopped in the preceding-vehicle approaching scene according to the present embodiment. In this way, upon deactivating the emission by the front central sonars 21a and 21b, it is further preferable if the inter-vehicle distance with the preceding vehicle 3 in front is measured by the radar 17 or the image pickup device 16 on the assumption that the echo of the preceding vehicle 3 is captured by the left and right corner sonars 21c and 21d.

If the vehicle 1 is following-up the preceding vehicle 3 while using the automatic steering function together, the vehicle 1 stops directly behind the preceding vehicle 3. In this case, the range detected by the left and right corner sonars 21c and 21d is located in a range where the pedestrian 81 entering between the vehicle 1 and the preceding vehicle 3 can be captured. The high-sensitivity areas of the left and right corner sonars 21c and 21d cover the part close to the preceding vehicle 3, and the part close to the corner sonar 21c or 21d that is not the high-sensitivity area can detect the pedestrian 81 using a short-distance detection. Thus, the pedestrian 81 fails to enter the front of the vehicle 1 without being captured by the left and right corner sonars 21c and 21d, so that the detection by the central sonars 21a and 21b can be omitted. Thus, the control unit 703 skips the order in which the central sonars 21a and 21b emit and controls the left and right corner sonars 21c and 21d to emit alternately, which doubles the frequency of detection by the left and right corner sonars 21c and 21d as compared with the case where the four front sonars 21 perform the emission in order. This makes it easier to detect pedestrians.

In the example illustrated in FIG. 27, an area 240 located in front of the vehicle 1 is not included in the detection range of the left and right corner sonars 21c and 21d. Thus, if the pedestrian 81 is located in the area 240, the front sonar 21 is likely to fail to detect the pedestrian 81. Thus, as a condition for disabling the detection by the central sonars 21a and 21b, it is necessary that the front sonar 21 does not detect the pedestrian 81. As described above, it is difficult for the pedestrian 81 to enter the area 240 without passing through the high-sensitivity area 230 located diagonally in front of the vehicle 1. Thus, the pedestrian 81 is detected by the front sonar 21 before reaching the area 240 so long as the front sonar 21 starts from the state in which the pedestrian 81 is not detected. Moreover, there can be an atypical positional relationship between the vehicle 1 and the preceding vehicle 3, such as a case where the vehicle 1 is stopped at a slight offset to the left or right rather than directly behind the preceding vehicle 3 or a case where the vehicle 1 is at an angle to the preceding vehicle 3 entering the corner. In such a case, one of the left and right corner sonars 21c and 21d is in a state of being unable to capture the preceding vehicle 3. In this way, in the case where one of the left and right corner sonars 21c and 21d is unable to capture the preceding vehicle 3, there is a gap, which can be entered without being detected by the left and right corner sonars 21c and 21d, in the area 240 located in front of the vehicle 1. Thus, the detection by the central sonars 21a and 21b should not be disabled.

Further, the control unit 703 is not limited to the control of causing the left and right corner sonars 21c and 21d to emit alternately and can execute the control of causing the left and right corner sonars 21c and 21d to emit simultaneously.

Figure 28:
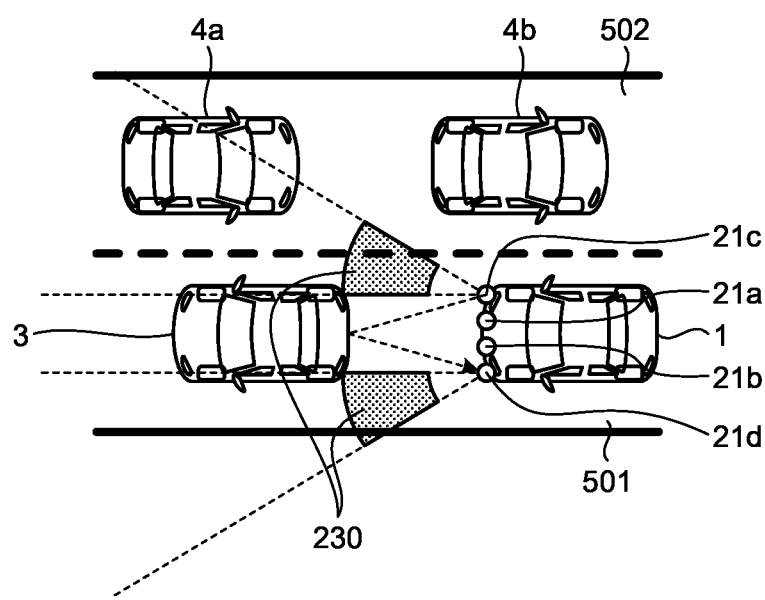
FIG. 28 is a diagram illustrating an example of a state in which the emission by the front central sonar is stopped, and left and right corner sonars emit simultaneously in the preceding-vehicle approaching scene according to an embodiment.

FIG. 28 is a diagram illustrating an example of a state in which the emission by the front central sonars 21a and 21b is stopped, and the left and right corner sonars 21c and 21d emit simultaneously in the preceding-vehicle approaching scene according to the present embodiment. There is the case, though it depends on the directivity of the corner sonars 21c and 21d, where the reflected waves of the ultrasonic waves emitted by one of the corner sonars 21 do not reach the other corner sonar 21 or if the reflected waves have the intensity that does not affect the detection even if the reflected waves reach. In this case, the control unit 703 can execute control to cause the left and right corner sonars 21c and 21d to emit simultaneously. In FIG. 28, in the case where the ultrasonic waves emitted by the right corner sonar 21c are reflected by the preceding vehicle 3 and the resultant echo reaches the left corner sonar 21d, a double echo occurs. Specifically, this echo reaches after the ultrasonic waves emitted by the left corner sonar 21d are reflected by the preceding vehicle 3 and the resultant echo reaches the left corner sonar 21d. However, if the control is performed such that the second echo is ignored on condition that both sonars are emitting at the same time, the left and right corner sonars 21c and 21d can be made to simultaneously emit, regardless of the intensity of the echo from the other sonar. In this way, in the case where the left and right corner sonars 21c and 21d are made to emit at the same time, the frequency of detection by the left and right corner sonars 21c and 21d can be quadrupled, compared with the case where the four front sonars 21 emit sequentially.

Further, the control unit 703 can deactivate the emission and change the emission interval of the respective front sonars 21 in dependence on the vehicle traffic flow in the adjacent lane.

Figure 29:
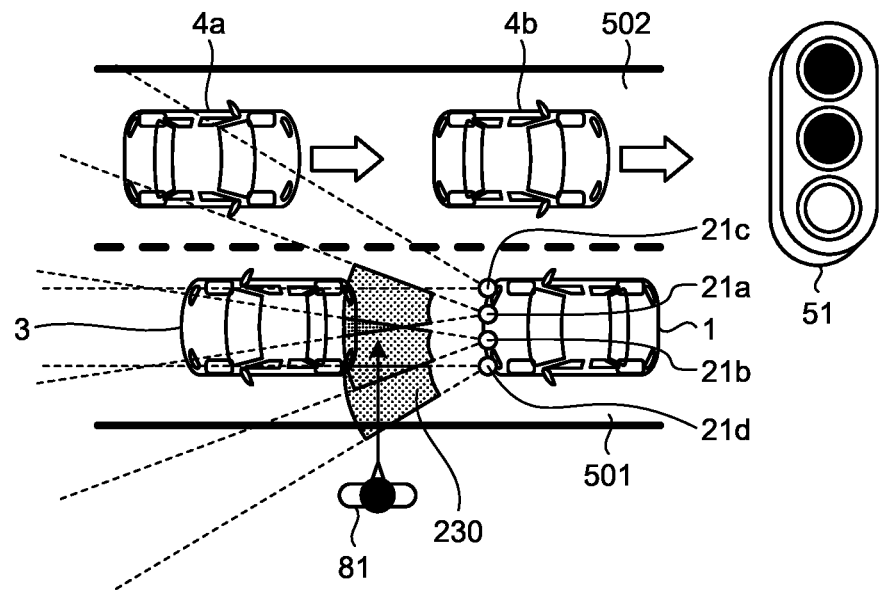
FIG. 29 is a diagram illustrating an example of controlling the presence or absence and a frequency of the emission from a front sonar in a case where the vehicle traffic flow in an adjacent lane is smooth in the preceding-vehicle approaching scene according to an embodiment.

FIG. 29 is a diagram illustrating an example of controlling the presence or absence and a frequency of the emission from the front sonar 21 in a case where the vehicle traffic flow in an adjacent lane is smooth in the preceding-vehicle approaching scene according to the present embodiment. The example illustrated in FIG. 29 shows a situation in which the traffic light 51 on the side of the oncoming lane 502, which is an adjacent lane, is lighted in blue. Thus, the other vehicles 4a and 4b on the oncoming lane 502 are traveling at a speed equal to or higher than a predetermined value.

In the case where the vehicle traffic flow in the adjacent lane is smooth, the pedestrian 81 does not enter the driver's own lane 501 from the side of the adjacent lane in which the vehicle traffic flow is smooth. By controlling to reduce the frequency of detection on the side of the adjacent lane where the pedestrian 81 is unlikely to enter, it is possible to focus the pedestrian detection on the opposite side of the adjacent lane.

In one example, in the example illustrated in FIG. 29, the control unit 703 can deactivate the emission from the first front corner sonar 21c on the side of the oncoming lane 502 and double the frequency of emission from the second front corner sonar 21d on the opposite side. In this case, the pedestrian 81 entering from the opposite side of the oncoming lane 502 can be detected twice as frequently as the case where the left and right corner sonars 21 emit evenly.

Figure 30:
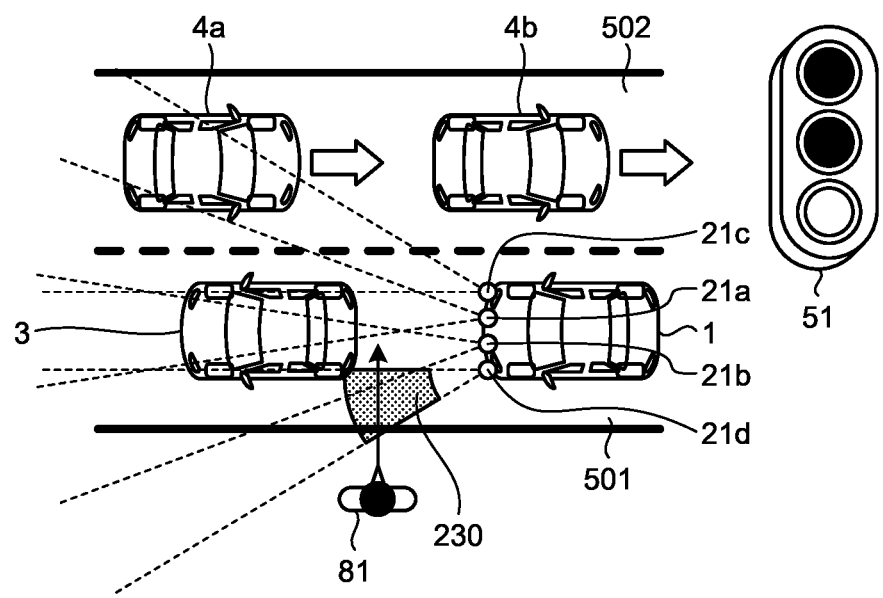
FIG. 30 is a diagram illustrating another example of controlling the presence or absence and a frequency of the emission of a front sonar in a case the vehicle traffic flow in an adjacent lane is smooth in the preceding-vehicle approaching scene according to an embodiment.

Further, FIG. 30 is a diagram illustrating another example of controlling the presence or absence and a frequency of the emission of the front sonar 21 in a case the vehicle traffic flow in an adjacent lane is smooth in the preceding-vehicle approaching scene according to the present embodiment. In the example illustrated in FIG. 30, only the second front corner sonar 21d located on the opposite side of the oncoming lane 502 emits ultrasonic waves, and the other front sonars 21 have their emission of ultrasonic waves stopped. In such a case, the frequency of detection by the second front corner sonar 21d is quadrupled as compared with the case where the four front sonars 21 emit evenly. The control to reduce the frequency of detection on the side of the adjacent lane where the pedestrian 81 is unlikely to enter is not limited to the control for deactivating the emission, but can be the control for thinning the emission interval. In one example, as an intermediate example between the example illustrated in FIG. 29 and the example illustrated in FIG. 30, by reducing the frequency of detection by the central sonar 21a and the central sonar 21b to half that of the case where the four front sonars 21 emit evenly, the frequency of detection by the second front corner sonar 21d can be tripled.

Moreover, upon detecting the pedestrian 81, the control unit 703 causes the sonar 21 that has deactivated the emission to resume the emission and returns the emission sequence of the four front sonars 21 to the normal order. In addition, for example, the vehicle control device 50 tracks the pedestrian 81 until the pedestrian 81 passes in front of the vehicle 1. In other words, as illustrated in FIGS. 29 and 30, the control to increase the frequency of detection of the corner sonar 21 accompanied by stopping the emission of part of the front sonars 21 or decreasing the frequency of emission is a measure used until the pedestrian 81 is detected.

The vehicle-pedestrian mixed scene will be described. The scene determination unit 702 determines that the scene is the vehicle-pedestrian mixed scene in the case where the location of the vehicle 1 is included in a predetermined geographical area or the case where the frequency of detecting the pedestrian 81 in the traveling direction of the vehicle 1 exceeds a predetermined value.

More specifically, in the case where the vehicle 1 is traveling and neither the crosswalk approaching scene nor the preceding-vehicle approaching scene, the scene determination unit 702 determines that the scene is the vehicle-pedestrian mixed scene in which other vehicles and pedestrians coexist if the scene where vehicle 1 is placed corresponds to conditions (4) and (5) below. Moreover, the scene determination unit 702 can make both conditions (4) and (5) indispensable or can determine that the scene is the vehicle-pedestrian mixed scene if only one of them is applicable.

Condition (4): Case where the vehicle 1 is determined to be located in a shopping district, a school zone, a residential road, or a parking lot. Condition (5): Case where the pedestrian 81 is detected at a frequency exceeding a predetermined value in the traveling direction of the vehicle 1 by the walking detection or face detection from image data.

The geographical area corresponding to the condition (4) mentioned above is an example of a predetermined geographical area in the present embodiment, and it is optional to change the geographical area as appropriate in view of the administrative divisions and regulations of the country or region in which the present invention is carried out. Moreover, these conditions are examples, and the determination conditions for the vehicle-pedestrian mixed scene are not limited to these examples.

Moreover, in the present embodiment, the residential road indicates, for example, a road whose width is equal to or less than a predetermined value in Japan. The predetermined width is, for example, 5.5 meters. In addition, the condition can be set in which the maximum speed is 30 km/h or less. The fact that the vehicle 1 is in a predetermined geographical area can be determined by a navigation system or can be determined from the image data. In one example, in the case where the centerline or the lane marking (not including the roadway edge marking) is not detected from the image data, it can be determined that the vehicle is located on the residential road.

Moreover, in the vehicle-pedestrian mixed scene, the scene discrimination by the scene determination unit 702 is intended to set the sonar 21 to be a state suitable for detecting the pedestrian 81, for example, in the case where the pedestrian 81 is likely to be in the traveling direction of the vehicle 1 and to apply braking if the pedestrian 81 is detected to be present in the traveling direction of the vehicle 1.

In the crosswalk approaching scene described above, the high-sensitivity area 230 is set using the crosswalk 9 as a reference. In the preceding-vehicle approaching scene described above, the high-sensitivity area 230 is set between the vehicle and the preceding vehicle 3. These settings make it possible to set the high-sensitivity area 230 reasonably or efficiently in dependence on the purpose.

On the other hand, the vehicle-pedestrian mixed scene corresponds to the case where it is difficult to specify the range in which the pedestrian 81 is necessary to be detected. Thus, if the crosswalk approaching scene or the preceding-vehicle approaching scene is applicable, these scenes are applied preferentially.

In one example, even while traveling in the geographical area corresponding to the conditions (4) and (5) mentioned above, there is the case where the preceding vehicle 3 travels in front of the vehicle 1 and the vehicle 1 is traveling at a low speed while maintaining an inter-vehicle distance that is detectable by the front sonar 21. In this case, the scene determination unit 702 can determine that the scene is the preceding-vehicle approaching scene. In this case, the control unit 703 can set the high-sensitivity area 230 between the vehicle 1 and the preceding vehicle 3.

Further, even while traveling in the geographical area corresponding to the conditions (4) and (5) mentioned above, upon approaching the crosswalk, it is estimated that a pedestrian will cross the crosswalk, and the high-sensitivity area can be set using the crosswalk as a reference. Only in the case where the traveling in the geographical area corresponding to the conditions (4) and (5) is not the determination condition for the crosswalk approaching scene or the preceding-vehicle approaching scene, the setting to change the determination that the scene is the vehicle-pedestrian mixed scene by regarding it as a more inferior scene is sufficiently possible. In one example, in the case where the vehicle passes through the crosswalk 9 or the distance to the preceding vehicle 3 is widened and exceeds the inter-vehicle distance (e.g., 10 meters) that can be detected by the front sonar 21, the scene determination unit 702 changes the scene determination such that the vehicle-pedestrian mixed scene is determined.

In the case where the scene determination result is the vehicle-pedestrian mixed scene, the control unit 703 changes either the detection sensitivity of reflected waves or the emission interval of ultrasonic waves in accordance with the vehicle speed of the vehicle 1.

The range of the high-sensitivity area 230 in the vehicle-pedestrian mixed scene will be described.

Figure 31:
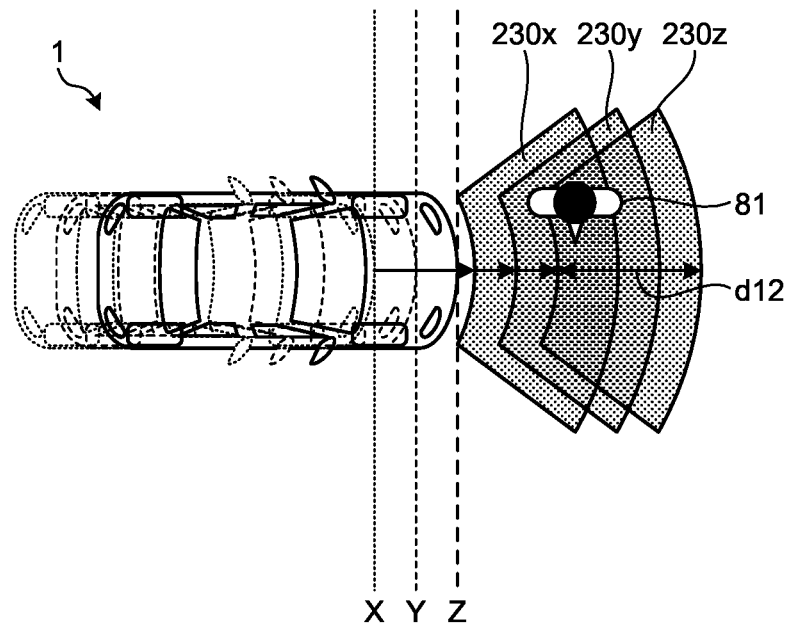
FIG. 31 is a diagram illustrating an example of a range of a high-sensitivity area in a vehicle-pedestrian mixed scene according to an embodiment.

FIG. 31 is a diagram illustrating an example of a range of the high-sensitivity area 230 in a vehicle-pedestrian mixed scene according to the present embodiment.

In the case where the scene determination result is the vehicle-pedestrian mixed scene, the control unit 703 sets the high-sensitivity area 230 in accordance with the vehicle speed on condition that the vehicle speed is equal to or less than a predetermined value. The high-sensitivity area 230 is set in a fan shape in front of the vehicle 1 as illustrated in FIG. 31. The predetermined value of the vehicle speed is, for example, 10 km/h, but is not limited to this value.

In FIG. 31, in the case where the position of the front-end portion of the vehicle 1 advances in the front direction of the vehicle 1 in the order of points X, Y, and Z, the high-sensitivity area 230 also advances in the front direction of the vehicle 1. Specifically, the high-sensitivity areas advance while keeping a given distance from the vehicle 1, such as a high-sensitivity area 230x illustrated in FIG. 31 in the case where the front-end portion of the vehicle 1 is at the point X, a high-sensitivity area 230y illustrated in FIG. 31 in the case where the front-end portion of the vehicle 1 is at the point Y, and a high-sensitivity area 230z illustrated in FIG. 31 in the case where the front-end portion of the vehicle 1 is at the point Z.

Further, FIG. 31 illustrates a situation in which the pedestrian 81 is in front of the vehicle 1. Furthermore, it is assumed that the pedestrian 81 is detectable by the front sonar 21 only when the pedestrian 81 is in the high-sensitivity area 230 and it is determined to be an obstacle when it is detected three times in a row. In this case, if the detection interval is 0.1 seconds and the vehicle speed is 3 m/s (10.8 km/h), the high-sensitivity area 230 advances by 30 centimeters for each detection. Thus, if the width of the high-sensitivity area 230 is 90 centimeters or more, it is detected three times in a row, and it is determined to be an obstacle. To allow the pedestrian 81 to be detected three times in a row, the width of the high-sensitivity area 230 is only necessary to be widened in accordance with the fact that the faster the vehicle speed, the greater the distance traveled by the vehicle 1 during the detection interval. However, making the width of the high-sensitivity area 230 directly proportional to the vehicle speed sometimes results in narrowing the width of the high-sensitivity area 230 excessively if the vehicle speed is low. In one example, if the width of the high-sensitivity area 230 is made directly proportional at the same ratio as that when the vehicle speed is 3 m/s, the width of the high-sensitivity area 230 will be 30 centimeters when the vehicle speed is 1 m/s. If the width of the high-sensitivity area 230 is narrow, there is a risk that the movement of the pedestrian 81 can cause it to deviate from the high-sensitivity area 230. Thus, a fixed value considering the moving speed of the pedestrian 81 is preferably added to the width of the high-sensitivity area 230. Supposing the speed of the pedestrian 81 is 1.5 m/s, the pedestrian moves 45 centimeters in 0.3 seconds when the detection is executed three times. Thus, for example, supposing the setting is made of "width (m) of high-sensitivity area 230=vehicle speed (m/s)×0.3 (S)+0.5 m" by adding a fixed value=0.5 m as a distance margin to the width of the high-sensitivity area 230, the width of the high-sensitivity area 230 is 1.4 meters for the vehicle speed of 3 m/s and 0.8 meters for the vehicle speed of 1 m/s.

The control unit 703 sets the distance between the vehicle 1 and the high-sensitivity area 230 using the braking distance as a reference. The distance traveled by the vehicle 1 from a point at which a driver recognizes a hazard to a point at which the brake is depressed is typically called the free running distance, whereas the distance traveled from a point at which the brake is depressed to a point at which the vehicle 1 stops is called the braking distance. The distance traveled by the vehicle 1 from a point at which a driver recognizes a hazard to a point at which the vehicle stops is called the stopping distance, so that the relationship of "stopping distance=free running distance+braking distance" is established. In the case of emergency braking based on the detection by the sonar, the distance traveled from a point at which the pedestrian 81 is first detected to a point at which it is determined to be an obstacle corresponds to the free running distance, and the distance traveled from the start of emergency braking to the stopping of vehicle 1 at the time when it is determined to be an obstacle corresponds to the braking distance. If it is redefined in this way, the distance traveled from a point at which the pedestrian 81 is first detected to a point at which the vehicle is stopped is the stopping distance, and the formula of "stopping distance=free running distance+braking distance" is established. The high-sensitivity area 230 uses the sonar 21 as a starting point, while the braking distance or the stopping distance is defined by the distance from the tip of the vehicle 1. However, the sonar 21 is generally installed at the tip of the vehicle 1, so it can be said that the position of the sonar 21 and the starting point of the braking distance are substantially the same. In other words, when the pedestrian 81 is detected for the first time at the far end of the high-sensitivity area, the high-sensitivity area far-end distance from the vehicle 1 that defines the far end of the high-sensitivity area 230 is set using the distance at which the vehicle 1 can be stopped on the near side of the pedestrian 81, that is, the stopping distance as a reference, and it is necessary to be equal to or longer than the stopping distance due to the need for pedestrian protection.

In one example, in the case where the vehicle speed is 3 m/s and the braking distance from the forced braking to the stopping after detecting three times in a row is 1 meter, the distance between the vehicle and the high-sensitivity area 230 needs to be at least 1 meter. The high-sensitivity area 230 with a width of 1.4 meters is set by adding a fixed value=0.5 m as a distance margin to the distance of 0.9 meters, which corresponds to the free running distance traveled by the vehicle 1 during three-times consecutive detection after then. In other words, from the fact that the stopping distance=1 m+0.9 m=1.9 m, the high-sensitivity area far-end distance needs to be at least 1.9 meters, whereas if the high-sensitivity area far-end distance is set to 2.4 meters, it is calculated that the vehicle can stop 0.5 meters before the pedestrian when the pedestrian is detected for the first time at the far end of the high-sensitivity area. This is an estimation of the minimum requirement distance, and the distance margin is too small, so it is desirable to make corrections such as increasing the margin of distance to pedestrians when the vehicle is stopped, in practice.

Figure 32:
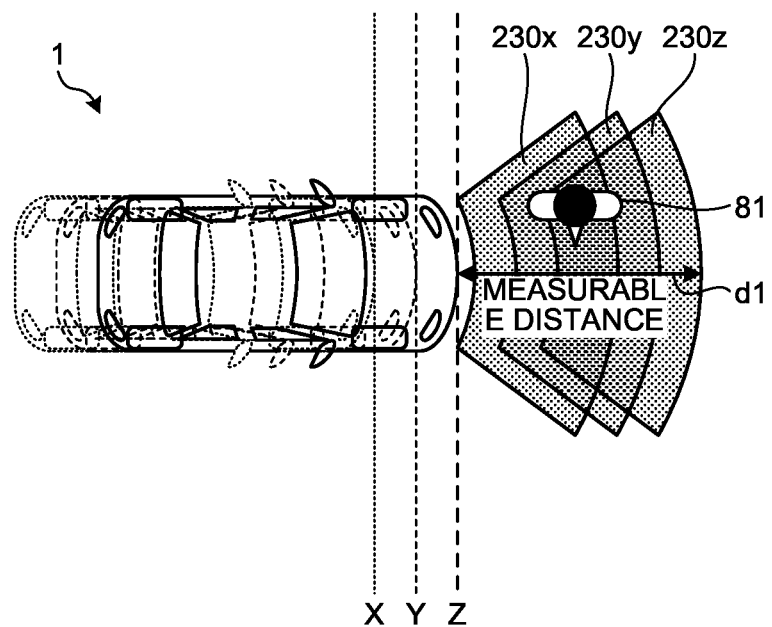
FIG. 32 is a diagram illustrating an example of a measurable distance in the vehicle-pedestrian mixed scene according to an embodiment.

FIG. 32 is a diagram illustrating an example of the measurable distance d1 in the vehicle-pedestrian mixed scene according to the present embodiment. In FIG. 32, the measurable distance d1 is the distance to the far end of the high-sensitivity area 230. In other words, the distance between the vehicle 1 and the end position of the high-sensitivity area 230 is the measurable distance d1. The control unit 703 can add the control to increase the frequency of detection by limiting the measurable distance d1.

In one example, in the case where the sound velocity is 340 m/s, assuming that the distance between the vehicle 1 and the start position of the high-sensitivity area 230, that is, the near end is 1 meter and the width of the high-sensitivity area 230 is 1 meter, the far end of the high-sensitivity area 230, that is, the distance to the end position will be 2 meters. In addition, in the case where there is an obstacle at the far end of the high-sensitivity area 230, the flight distance of the ultrasonic waves is 4 meters. The ultrasonic waves reciprocate this distance at 11.8 msec, and if the ultrasonic wave emission interval is 12.5 msec, the detection of the ultrasonic waves reflected at the far end of the high-sensitivity area 230 is not hindered by the subsequent ultrasonic wave emission. In the case where the four front sonars 21 emit in order, the emission interval of one front sonar 21 is 50 msec. In the case where it is determined to be an obstacle when it is detected three times in a row, it can be determined to be an obstacle in at least 150 msec.

If the emission interval of ultrasonic waves is set to 25 msec, which is twice the emission interval of 12.5 msec, it is possible to detect an obstacle up to the distance of 4 meters, which is twice the measurable distance of 2 meters in the case where the emission interval is 12.5 msec. In the case where the four front sonars 21 emit in order, the emission interval of one front sonar 21 is 100 msec. In the case where it is determined to be an obstacle upon being detected three times in a row, it can be determined to be an obstacle in at least 300 msec. This is an example of extending the distance at which obstacles can be detected at the cost of reducing the frequency of detection. In this case as well, the distance between the vehicle 1 and the high-sensitivity area 230 is set to the distance at which the vehicle 1 can be stopped, that is, equal to or greater than the braking distance, but the width of the high-sensitivity area 230 is calculated in dependence on the emission interval.

Specifically, the control unit 703 determines the distance between the vehicle 1 and the high-sensitivity area 230 using the distance, which is possible to start emergency braking when the pedestrian 81 is detected three times in a row and to stop directly before the pedestrian 81, as a reference.

In one example, in the case where the detection interval when the vehicle speed of 3 m/s is 50 msec and the distance traveled from detection to stopping is 1 meter, the control unit 703 sets the distance between the vehicle 1 and the start position of the high-sensitivity area 230 to 1 meter. It takes 150 msec to perform the three-time detection, so that the reflected waves exceed the detection threshold value for the first time at a position of 2 meters from the vehicle 1, and the one detected by the reflected waves 150 msec later is assumed to be determined to be an obstacle. During this period, the vehicle 1 advances 45 centimeters, so that the vehicle 1 can be stopped 55 centimeters before the detected obstacle even if the vehicle 1 is further advanced by 1 meter until the vehicle 1 is stopped.

In another example, in the case where the ultrasonic wave emission interval is set to 25 msec and an obstacle at the distance of 4 meters can be detected, it takes 300 msec until the control unit 703 can determine that the detected one is an obstacle, and during this time, the vehicle 1 advances 0.9 meters. If it is determined to be an obstacle and then stopped after advancing 1 meter, the vehicle is stopped on the near side of 2.1 meters before the obstacle. The distance to the obstacle upon being stopped is long, but a collision prevention system regards that there is no problem so long as there is no collision, so that the stopping directly before 2.1 meters is likely to be excessive. However, if the emission interval of ultrasonic waves is halved to 12.5 msec, the frequency of detection is doubled, so that the pedestrian 81 is more likely to be detected. However, the measurable distance d1 is halved to 2 meters, so even if stopping directly before 55 centimeters is possible after detecting the pedestrian 81, the pedestrian 81 is likely to be surprised. In other words, considering that the obstacle is the pedestrian 81, there is a possibility that the distance to the pedestrian upon being stopped is insufficient. As an application of the implementation, it is desirable to set the measurable distance d1 by adding a margin considering the psychology on the side of the pedestrian 81 while using the distance that can be guaranteed not to collide as a standard. The description above is given, as an example of an easy-to-understand estimation, that the emission interval is set first, the stopping distance is calculated, and the vehicle stops on the near side of the pedestrian. However, the emission interval is determined by the measurable distance d1, and the measurable distance d1 and the high-sensitivity area far-end distance are identical. Thus, the high-sensitivity area far-end distance is set first on the basis of the distance that can be guaranteed not to collide, the emission interval is calculated backward from the "high-sensitivity area far-end distance=measurable distance d1", and the width of the high-sensitivity area can be set in proportion to the emission interval. The determination of the emission interval makes it possible to estimate the distance margin when the vehicle is stopped on the near side of a pedestrian, which is as described above.

The pedestrian 81 is difficult to be detected because the reflectance of ultrasonic waves is low, and the longer the distance from the sonars 21 and 22, the weaker the echo. Thus, in the present embodiment, the measurable distance d1 is determined on the basis of the distance that can be guaranteed not to collide, and the inside of the measurable distance d1 is used as the high-sensitivity area 230 to detect the pedestrian 81. Thus, it is possible to detect the pedestrian 81 more reliably.

Moreover, the control unit 703 can set the braking distance according to the vehicle speed of the vehicle 1 or the high-sensitivity area near-end distance using the larger of the predetermined default values as a reference. In one example, as the performance of the sonar, if the distance from the sonar is a vicinity region within 1 meter and a pedestrian can be detected without setting the high-sensitivity area, in the vehicle speed range where the vehicle speed is less than 3 m/s and the braking distance is less than 1 meter, the high-sensitivity area near-end distance can be fixed at 1 meter according to the vicinity region. In this case, it is possible to detect a pedestrian even if the pedestrian enters inside of the high-sensitivity area near-end distance, which eliminates the need to specify the width of the high-sensitivity area, and it is possible to avoid collision by ensuring that the high-sensitivity area far-end distance does not fall below the stopping distance.

Moreover, while FIGS. 31 and 32 illustrate the case where the vehicle 1 moves, the control based on the determination result of the vehicle-pedestrian mixed scene can be executed not only when the vehicle 1 is traveling but also when the vehicle is stopped.

Figure 33:
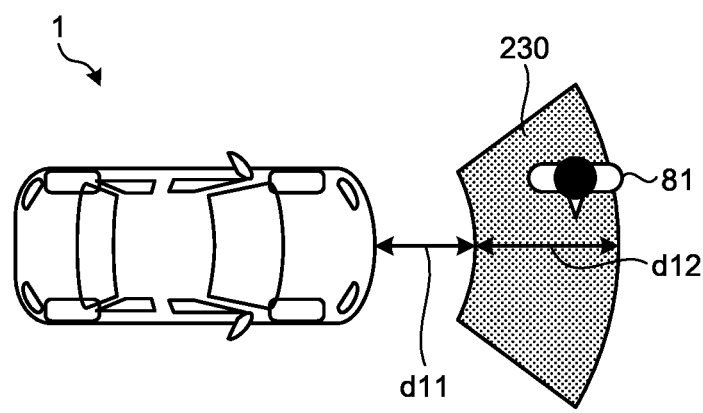
FIG. 33 is a diagram illustrating an example of the width of a high-sensitivity area and the high-sensitivity area near-end distance of the stopped vehicle in the vehicle-pedestrian mixed scene according to an embodiment.

FIG. 33 is a diagram illustrating an example of the width d12 of the high-sensitivity area 230 and the high-sensitivity area near-end distance d11 of the stopped vehicle 1 in the vehicle-pedestrian mixed scene according to the present embodiment.

The description above is given of the situation where the control unit 703 sets the high-sensitivity area 230 in accordance with the vehicle speed on the assumption that the vehicle 1 is traveling in the case of the vehicle-pedestrian mixed scene. However, the scene determination unit 702 can apply the vehicle-pedestrian mixed scene even when the vehicle is stopped. In this case, the control unit 703 can set the fan-shaped high-sensitivity area 230 in front of the vehicle 1 even when the vehicle 1 is stopped. In other words, the scene determination unit 702 can exclude the fact that the vehicle 1 is traveling from the condition for determining the vehicle-pedestrian mixed scene.

In the case where the vehicle 1 is stopped, the high-sensitivity area 230 does not move forward, so that the same range is detected repeatedly. The description is given of a case where the pedestrian 81 is moving and the pedestrian 81 is detected three times in a row in the high-sensitivity area 230. In one example, in a case where the detection interval is 0.1 seconds and the walking speed is 1.5 m/s (5.4 km/h), the pedestrian 81 moves 45 centimeters during three-time detection.

In the case of applying "vehicle speed=0" to the calculation formula of the width d12 of the high-sensitivity area 230 "width (m) of high-sensitivity area 230=vehicle speed (m/s)×0.3 (S)+0.5 m", the width d12 of the high-sensitivity area 230 is 0.5 meters, and even if the pedestrian 81 moves, the condition for being detected as an obstacle is satisfied. In the case where the vehicle 1 is stopped, the braking distance from braking to stopping is 0 meters, so that the high-sensitivity area near-end distance is 0 meters when determined on the basis of the vehicle speed. However, it can be expected that the pedestrian 81 can be detected in the vicinity region of the sonars 21 and 22, for example, the region within 1 meter without setting the region to be the high sensitivity. Thus, the distance between the vehicle and the high-sensitivity area 230 can be uniformly set to 1 meter when the high-sensitivity area near-end distance based on the vehicle speed is 1 meter or less, for example, when the vehicle speed is 3 m/s or less. As an example of setting the high-sensitivity area 230, for example, the distance between the vehicle and the high-sensitivity area 230 is 1 meter, and from that point, the fan-shaped high-sensitivity area 230 with a width of 50 centimeters is set.

In the case where the pedestrian 81 is detected when the vehicle 1 is stopped, it is advisable to maintain the braking or suppress the acceleration of the vehicle 1. In one example, when the pedestrian 81 is detected in the high-sensitivity area 230 of 1 to 1.5 meters from the vehicle 1, the advancement at low acceleration as a form of acceleration suppression is allowed, and the distance to the pedestrian 81 is tracked, and if the pedestrian 81 is within 1 meter from the vehicle, the braking can be performed. In this way, smooth control is possible by detecting the pedestrian 81 by applying the same scene determination as in the case of low speed even when the vehicle is stopped. Moreover, in the case where an obstacle is detected, braking is performed for the traveling vehicle 1, and if the vehicle 1 is stopped, braking is maintained, or acceleration is suppressed. For such control, a general technique is applicable as a control of the vehicle 1 using the detection result obtained by the sonar 21.

In one example, the speed control device 40 suppresses the acceleration of the vehicle 1 in the case where the scene determination result is the vehicle-pedestrian mixed scene and the pedestrian 81 is detected at a position equal to or less than a first distance from the vehicle 1. In addition, in the case where the scene determination result is the vehicle-pedestrian mixed scene and the pedestrian 81 is detected at a position equal to or less than a second distance that is shorter than the first distance from the vehicle 1, the vehicle 1 can be braked. The first distance can be, for example, approximately 1.5-meter distance as described above. In addition, the second distance can be, for example, approximately 1-meter distance as described above.

In addition, the limitation on the vehicle speed of the vehicle 1 in the vehicle-pedestrian mixed scene is further described.

In one example, ultrasonic waves emitted by other vehicles can enter the sonars 21 and 22, so for example, the vehicle control device 50 determines that an obstacle is detected on condition that the change in the coordinates of a detected object is tracked and the same object is continuously detected. Thus, for the width d12 of the high-sensitivity area 230 in front of the traveling vehicle 1 to prevent an obstacle from deviating from the high-sensitivity area 230 even when the vehicle 1 moves, the faster the vehicle speed of the vehicle 1, the wider the width d12 of the high-sensitivity area 230 needs to be.

However, in the high-sensitivity area 230, unnecessary detection occurs in which echoes from an unobstructed object such as road surface irregularities exceed a detection threshold value. Thus, if the width d12 of the high-sensitivity area 230 is made wider, the number of unnecessary detection tasks also increases. If the width of the high-sensitivity area 230 is made wider in dependence on the vehicle speed, there is a risk that the number of such unnecessary detection tasks exceeds the limit of the number that can be tracked by the vehicle control device 50 or the like. In other words, the width of the high-sensitivity area 230 has a practical upper limit, so that the vehicle speed at which the pedestrian 81 can be detected in the high-sensitivity area 230 also has a practical upper limit.

Thus, in the case where the scene determination unit 702 determines that the scene is the vehicle-pedestrian mixed scene, specifically, in the case where one or both of the conditions (4) and (5) mentioned above are satisfied, it is desirable that the speed control device 40 limits the vehicle speed up to a vehicle speed at which the pedestrian 81 can be detected in the high-sensitivity area 230, so that the pedestrian 81 can be reliably detected, and a collision can be avoided.

The description is now given of the procedure of the scene determination processing executed by the in-vehicle system 100 configured as described above.

Figure 34:
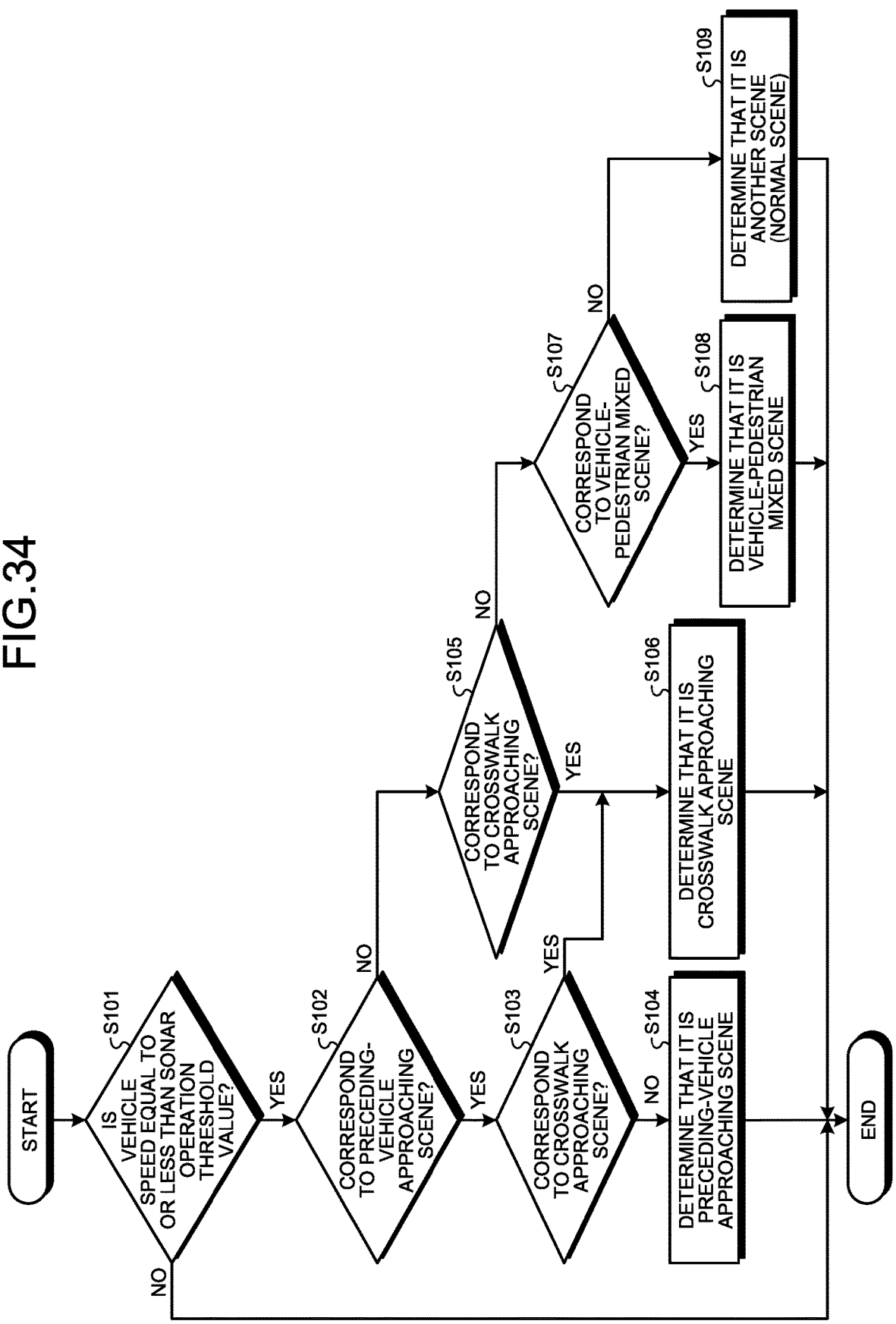
FIG. 34 is a flowchart illustrating an example of the procedure of the scene determination processing according to an embodiment.

FIG. 34 is a flowchart illustrating an example of the procedure of the scene determination processing according to the present embodiment.

The scene determination unit 702 first determines whether the vehicle speed of the vehicle 1 is equal to or less than the sonar operation threshold value (S101).

If the vehicle speed of the vehicle 1 is greater than the sonar operation threshold value ("No" in S101), the sonars 21 and 22 are deactivated, so that the scene determination processing ends. Moreover, the sonar operation threshold value is, for example, 20 km/h.

On the other hand, if the vehicle speed of the vehicle 1 is equal to or less than the sonar operation threshold value ("Yes" in S101), the scene determination unit 702 determines whether or not the scene in which the vehicle 1 is placed corresponds to the preceding-vehicle approaching scene (S102). The determination condition for the preceding-vehicle approaching scene is, for example, that the preceding vehicle 3 is detected within the distance detectable by the front sonar 21. The distance detectable by the front sonar 21 is, for example, 10 meters.

In response to determining that the scene in which the vehicle 1 is placed corresponds to the preceding-vehicle approaching scene ("Yes" in S102), the scene determination unit 702 further determines whether or not the scene in which the vehicle 1 is placed corresponds to the crosswalk approaching scene (S103). In this case, the determination condition for the crosswalk approaching scene is that the crosswalk 9 is located between the vehicle 1 and the preceding vehicle 3, the preceding vehicle 3 is not on the crosswalk 9, and the vehicle speed of the vehicle 1 is equal to or less than a crosswalk threshold value. The crosswalk threshold value is, for example, 2 km/h. In other words, even in the case where there is the crosswalk 9 between the preceding vehicle 3 and the vehicle 1, if the vehicle 1 is traveling at 2 km/h or more, the pedestrian 81 will not cross, so that there is no need to apply the crosswalk approaching scene. Moreover, the determination conditions for the crosswalk approaching scene are not limited to this example. In particular, the determination conditions for the crosswalk approaching scene can differ in dependence on whether the vehicle is approaching the preceding vehicle 3 or not. In one example, in the case where the vehicle is not approaching the preceding vehicle 3, the fact that the vehicle speed is equal to or less than the crosswalk threshold value is not the determination condition. If the vehicle is approaching the crosswalk 9, it can be determined that the scene is the crosswalk approaching scene.

In response to determining that the scene in which the vehicle 1 is placed corresponds to the crosswalk approaching scene ("Yes" in S103), the scene determination unit 702 determines that the scene in which the vehicle 1 is placed is the crosswalk approaching scene (S106).

On the other hand, in response to determining that the scene in which the vehicle 1 is placed does not correspond to the crosswalk approaching scene ("No" in S103), the scene determination unit 702 determines that the scene is the preceding-vehicle approaching scene (S104).

As a result of the determination processing of S102, if the scene does not correspond to the preceding-vehicle approaching scene ("No" in S102), the scene determination unit 702 determines whether or not the scene in which the vehicle 1 is placed corresponds to the crosswalk approaching scene (S105). In this case, the determination condition for the crosswalk approaching scene is, for example, that the crosswalk 9 is in front of the vehicle 1 and the distance between the crosswalk 9 and the vehicle 1 is less than or equal to the distance detectable by the front sonar 21 (e.g., 10 meters). If the determination condition is satisfied ("Yes" in S105), the scene determination unit 702 determines that the scene in which the vehicle 1 is placed is the crosswalk approaching scene (S106). Moreover, there is a case where even if the crosswalk 9 is in front of the vehicle 1, it is not determined to be the crosswalk approaching scene, but determined to be the vehicle-pedestrian mixed scene, and accordingly the processing performed. As an example of such a case, if the vehicle 1 enters the scramble crossing and is stopped, it is not expected that the pedestrian 81 moves within the range of the crosswalk 9 in front, so controlling the crosswalk approaching scene that sets the high-sensitivity area within the range of crosswalk 9 is inappropriate. In addition, even in the case where the vehicle 1 is stopped immediately before the wide crosswalk 9 and the range of the crosswalk 9 fails to be covered by the high-sensitivity area, it is safer to apply the control of the vehicle-pedestrian mixed scene to make the surroundings of the vehicle 1 to be the high-sensitivity area. Although the details of the condition are omitted, the determination conditions for the crosswalk approaching scene can be set such that these situations are excluded.

On the other hand, if the determination condition is not satisfied ("No" in S105), the scene determination unit 702 further determines whether or not the scene in which the vehicle 1 is placed corresponds to the vehicle-pedestrian mixed scene (S107). The determination condition for the vehicle-pedestrian mixed scene is that either or both of (4) and (5) mentioned above are satisfied.

If the scene in which the vehicle 1 is placed corresponds to the vehicle-pedestrian mixed scene ("Yes" in S107), the scene determination unit 702 determines that the scene in which the vehicle 1 is placed is the vehicle-pedestrian mixed scene (S108).

On the other hand, if the scene in which the vehicle 1 is placed does not correspond to the vehicle-pedestrian mixed scene ("No" in S107), the scene determination unit 702 determines that the scene in which the vehicle 1 is placed is another scene, that is, a normal scene (S109).

The determination result of the scene in which the vehicle 1 is placed is obtained by such scene determination processing, and then the control unit 703 or the like controls the sonars 21 and 22 in response to the scene determination result.

As described above, the vehicle 1 of the present embodiment includes the sonars 21 and 22, which emit ultrasonic waves and measure the time until the reflected waves reflected by an object around the vehicle 1 are received. This makes it possible to detect an object around the vehicle 1 and to obtain distance information indicating the distance to the detected object. In addition, the sensor control device 70 of the present embodiment determines the scene in which the vehicle 1 is placed. This determination is based on at least one of distance information, vehicle speed information indicating the speed of the vehicle 1, image data obtained by the image pickup device 16 that captures the surroundings of the vehicle 1, and location information used to identify the location of the vehicle 1 on the map. Then, at least one of the detection sensitivity of reflected waves, the emission interval of ultrasonic waves, and the emission sequence of ultrasonic waves is changed on the basis of the scene determination result. Thus, the sensor control device 70 of the present embodiment makes it possible to detect the pedestrian 81 or the like with high precision in dependence on the situation around the vehicle 1.

Moreover, in the present embodiment, the scene determination unit 702 determines whether the scene in which the vehicle 1 is placed is the crosswalk approaching scene, the preceding-vehicle approaching scene, the vehicle-pedestrian mixed scene, or the normal scene. However, all these scenes do not necessarily need to be a target to be determined.

Specifically, the scene determination unit 702 can be equipped with a function of determining one or more of the crosswalk approaching scene, the preceding-vehicle approaching scene, and the vehicle-pedestrian mixed scene. In one example, the scene determination unit 702 can be equipped with only a function of determining whether or not the scene in which the vehicle 1 is placed is the crosswalk approaching scene. In this case, if the scene does not correspond to the crosswalk approaching scene, it is determined to be the normal scene (other scenes). The same applies to the case of determining only the preceding-vehicle approaching scene or the case of determining only the vehicle-pedestrian mixed scene. The determination of which scene corresponds to can vary in dependence on the classification of country, region, or road in which the vehicle is traveling. In one example, in an automobile-only road where no crosswalk is set on the road or in an area where the rules for using the crosswalk are not required, the crosswalk approaching scene can be excluded from the scene determination.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

According to the object detection apparatus according to the present disclosure, it is possible to appropriately detect a pedestrian or the like with sensitivity, detection range, or frequency of detection in dependence on the situation around the vehicle.

What is claimed is:

1. An object detection apparatus, comprising:
   distance measuring devices, each of the distance measuring devices being provided in a vehicle and configured to
      emit ultrasonic waves,
      measure a time from emission of the ultrasonic waves until receiving reflected waves reflected by an object around the vehicle,
      detect an object around the vehicle, and
      obtain distance information indicating a distance to the detected object; and
   a hardware processor connected to a memory and configured to
      determine a scene in which the vehicle is placed, the determination being performed on a basis of at least one of the distance information, vehicle speed information indicating a speed of the vehicle, image information obtained by capturing an image of surroundings of the vehicle by an image pickup device, and location information identifying a location of the vehicle on a map, and
      perform, on a basis of a scene determination result obtained by the hardware processor, at least one of setting of a high-sensitivity area where sensitivity for detecting the reflected waves is temporarily increased, a change of an emission interval of the ultrasonic waves, and a change of an emission sequence of the ultrasonic waves,
   wherein each of the distance measuring devices includes:
      a conversion element configured to receive the reflected waves and convert the reflected waves into a reception signal;
      an amplification circuit configured to amplify the reception signals to be amplified reception signals; and
      a detection circuit configured to detect the object around the vehicle by comparing intensities of the amplified reception signals and a threshold value, and
   the hardware processor temporarily increases a sensitivity of the distance measuring devices by changing at least one of an amplification factor in the amplification circuit or the threshold value in the detection circuit.

2. The object detection apparatus according to claim 1, wherein the hardware processor is further configured to
   set a high-sensitivity area far-end distance as a distance between one of the distance measuring devices and the far end of the high-sensitivity area, by using a measurable distance as a reference, the measurable distance being an upper limit of a distance measurable by the one of the distance measuring devices, or
   set the measurable distance by using the high-sensitivity area far-end distance as the reference, and
   set the emission interval in accordance with the measurable distance.

3. The object detection apparatus according to claim 1, wherein
   the scene in which the vehicle is placed is a vehicle-pedestrian mixed scene in which other vehicles and pedestrians coexist around the vehicle,
   the processor is further configured to determine that the scene is the vehicle-pedestrian mixed scene when a location of the vehicle is included in a predetermined geographical area or when a frequency of detecting a pedestrian in a traveling direction of the vehicle exceeds a predetermined value, and
   the processor is further configured to, when the scene determination result is the vehicle-pedestrian mixed scene, perform either the setting of the high-sensitivity area or the change of the emission interval of the ultrasonic waves in accordance with a vehicle speed of the vehicle.

4. The object detection apparatus according to claim 3, wherein the processor is further configured to set, in accordance with the vehicle speed, a high-sensitivity area far-end distance as a distance between one of the distance measuring devices and the far end of the high-sensitivity area by using a sum of a free running distance and a braking distance as a reference, the free running distance being a distance traveled by the vehicle in a period from when the object is first detected till when braking starts, the braking distance being in dependence on the vehicle speed of the vehicle.

5. The object detection apparatus according to claim 3, wherein the hardware processor is further configured to set a high-sensitivity area near-end distance as a distance between the distance measuring devices and a near-end of the high-sensitivity area by using a larger one of a braking distance and a predetermined default value as a reference, the braking distance being in dependence on the vehicle speed of the vehicle.

6. The object detection apparatus according to claim 3, wherein the predetermined geographical area includes a shopping district, a school zone, a residential road, or a parking lot.

7. The object detection apparatus according to claim 3, wherein the processor is further configured to determine that the scene is not the vehicle-pedestrian mixed scene but is a preceding-vehicle approaching scene or a crosswalk approaching scene when the scene is the preceding-vehicle approaching scene where the vehicle is approaching and following a preceding vehicle or the scene is the crosswalk approaching scene where the vehicle is approaching a crosswalk, while the location of the vehicle is included in the predetermined geographical area.

8. The object detection apparatus according to claim 3, wherein the processor is further configured to limit the vehicle speed of the vehicle when the scene determination result is the vehicle-pedestrian mixed scene.

9. An object detection apparatus, comprising:
distance measuring devices, each of the distance measuring devices being provided in a vehicle and configured to
emit ultrasonic waves,
measure a time from emission of the ultrasonic waves until receiving reflected waves reflected by an object around the vehicle,
detect an object around the vehicle, and
obtain distance information indicating a distance to the detected object; and
a hardware processor connected to a memory and configured to
determine a scene in which the vehicle is placed, the determination being performed on a basis of at least one of the distance information, vehicle speed information indicating a speed of the vehicle, image information obtained by capturing an image of surroundings of the vehicle by an image pickup device, and location information identifying a location of the vehicle on a map, and
perform, on a basis of a scene determination result obtained by the hardware processor, at least one of setting of a high-sensitivity area where sensitivity for detecting the reflected waves is temporarily increased, a change of an emission interval of the ultrasonic waves, and a change of an emission sequence of the ultrasonic waves,
wherein the scene determined by the hardware processor is a crosswalk approaching scene where the vehicle is approaching a crosswalk,
the hardware processor is further configured to, when the scene determination result is the crosswalk approaching scene, perform one of the setting of the high-sensitivity area, the change of the emission interval, and the change of the emission sequence by using, as a reference, a range corresponding to the crosswalk or an area where the crosswalk is extended to a sidewalk,
at least one of the distance measuring devices includes:
a sidewalk-side distance measuring device provided to direct a direction on a near side of the sidewalk with respect to a traveling direction of the vehicle; and
a roadway-side distance measuring device provided to direct a direction on a near side of a center of a roadway with respect to the traveling direction of the vehicle, and
the hardware processor, when the scene determination result is the crosswalk approaching scene, sets a high-sensitivity area of the sidewalk-side distance measuring device to be larger than a high-sensitivity area of the roadway-side distance measuring device.

10. The object detection apparatus according to claim 9, wherein the hardware processor is further configured to, when the scene determination result is the crosswalk approaching scene, change the emission sequence of the ultrasonic waves and cause a frequency of emission of the ultrasonic waves by the sidewalk-side distance measuring device to be higher than a frequency of emission of the ultrasonic waves by the roadway-side distance measuring device.

11. The object detection apparatus according to claim 9, wherein
the hardware processor is further configured to deactivate emission from the roadway-side distance measuring device when the scene determination result is the crosswalk approaching scene.

12. An object detection apparatus, comprising:
distance measuring devices, each of the distance measuring devices being provided in a vehicle and configured to
emit ultrasonic waves,
measure a time from emission of the ultrasonic waves until receiving reflected waves reflected by an object around the vehicle,
detect an object around the vehicle, and
obtain distance information indicating a distance to the detected object; and
a hardware processor connected to a memory and configured to
determine a scene in which the vehicle is placed, the determination being performed on a basis of at least one of the distance information, vehicle speed information indicating a speed of the vehicle, image information obtained by capturing an image of surroundings of the vehicle by an image pickup device, and location information identifying a location of the vehicle on a map, and
perform, on a basis of a scene determination result obtained by the processor, at least one of setting of a high-sensitivity area where sensitivity for detecting the reflected waves is temporarily increased, a change of an emission interval of the ultrasonic waves, and a change of an emission sequence of the ultrasonic waves,
wherein the scene determined by the hardware processor is a preceding-vehicle approaching scene where the vehicle is approaching and following a preceding vehicle,
the hardware processor is further configured to, when the scene determination result is the preceding-vehicle approaching scene, perform any of the setting of the high-sensitivity area, the change of the emission interval of the ultrasonic waves, and the change of the emission sequence of the ultrasonic waves, by using a distance between the vehicle and the preceding vehicle as a reference,
at least one of the distance measuring devices includes:
a central distance measuring device provided to direct a traveling direction of the vehicle;
a sidewalk-side distance measuring device provided to direct a direction on a near side of the sidewalk with respect to a traveling direction of the vehicle; and
a roadway-side distance measuring device provided to direct a direction on a near side of a center of a roadway with respect to the traveling direction of the vehicle, and
the hardware processor, when the scene determination result is the preceding-vehicle approaching scene, changes the emission sequence of the ultrasonic waves and causes a frequency of emission of the ultrasonic waves by the sidewalk-side distance measuring device to be higher than a frequency of emission of ultrasonic waves by the central distance measuring device.

13. The object detection apparatus according to claim 12, wherein
the at least one of the distance measuring devices includes:
a right-hand distance measuring device provided to direct a direction on a near side of right with respect to the traveling direction of the vehicle, and
a left-hand distance measuring device provided to direct a direction on a near side of left with respect to the traveling direction of the vehicle, and
the hardware processor is further configured to, when the scene determination result is the preceding-vehicle approaching scene
determine whether a vehicle traffic flow in an adjacent lane is stagnant or smooth, and
cause a frequency of emission from one of the right-hand distance measuring device and the left-hand distance measuring device on a side of the adjacent lane in which the vehicle traffic flow is smooth to be lower than a frequency of emission from one of the right-hand distance measuring device and the left-hand distance measuring device on a side of the adjacent lane in which the vehicle traffic flow is stagnant or to be lower than a frequency of emission from one of the right-hand distance measuring device and the left-hand distance measuring device on the sidewalk side.

14. The object detection apparatus according to claim 12, wherein the hardware processor is further configured to
determine whether or not the scene in which the vehicle is placed is the preceding-vehicle approaching scene on condition that the vehicle is approaching and following the preceding vehicle,
determine that the scene in which the vehicle is placed is a crosswalk approaching scene if a crosswalk is located between the vehicle and the preceding vehicle in a case where the vehicle is approaching the crosswalk, and
determine that the scene in which the vehicle is placed is the preceding-vehicle approaching scene when the crosswalk is not located between the vehicle and the preceding vehicle and the vehicle is approaching the crosswalk.

15. The object detection apparatus according to claim 12, wherein the hardware processor is further configured to, when the scene determination result is the preceding-vehicle approaching scene, set the measurable distance of the at least one of the distance measuring devices by using a distance between the vehicle and the preceding vehicle as a reference.

16. The object detection apparatus according to claim 12, wherein
the at least one of the distance measuring devices include
a central distance measuring device provided to direct a traveling direction of the vehicle,
a right-hand distance measuring device provided to direct a direction on a near side of right with respect to the traveling direction of the vehicle, and
a left-hand distance measuring device provided to direct a direction on a near side of left with respect to the traveling direction of the vehicle, and
the hardware processor is further configured to deactivate emission from the central distance measuring device when the scene determination result is the preceding-vehicle approaching scene.

17. The object detection apparatus according to claim 16, wherein the hardware processor is further configured to cause the right-hand distance measuring device and the left-hand distance measuring device to simultaneously emit when the emission from the central distance measuring device is deactivated.

* * * * *